US011750330B2

(12) United States Patent
Wu et al.

(10) Patent No.: US 11,750,330 B2
(45) Date of Patent: Sep. 5, 2023

(54) RADIO LINK MONITORING FOR SIDELINK COMMUNICATIONS

(71) Applicant: QUALCOMM Incorporated, San Diego, CA (US)

(72) Inventors: Shuanshuan Wu, San Diego, CA (US); Sudhir Kumar Baghel, Hillsborough, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 16/994,116

(22) Filed: Aug. 14, 2020

(65) Prior Publication Data

US 2021/0067277 A1    Mar. 4, 2021

Related U.S. Application Data

(60) Provisional application No. 62/893,680, filed on Aug. 29, 2019.

(51) Int. Cl.
*H04L 1/1812* (2023.01)
*H04W 24/08* (2009.01)

(52) U.S. Cl.
CPC .......... *H04L 1/1812* (2013.01); *H04W 24/08* (2013.01)

(58) Field of Classification Search
CPC ... H04L 1/1812; H04L 1/1825; H04L 1/1867; H04L 1/188; H04W 24/08; H04W 76/38; H04W 76/19; H04W 76/14
See application file for complete search history.

(56) References Cited

U.S. PATENT DOCUMENTS

| 7,647,541 B2 * | 1/2010 | Terry ................ H04W 72/1284 714/749 |
| 10,312,948 B1 * | 6/2019 | Arikan .............. H03M 13/6306 |
| 2017/0359131 A1 * | 12/2017 | Mashimo .............. H04W 48/18 |
| 2019/0029073 A1 * | 1/2019 | Yiu ........................ H04W 48/16 |

(Continued)

FOREIGN PATENT DOCUMENTS

WO    WO-2018135677 A1    7/2018

OTHER PUBLICATIONS

Huawei et al; Sidelink physical layer procedure for NR V2X; 3GPP draft; XP051764663, Aug. 17, 2019 (Year: 2019).*

(Continued)

*Primary Examiner* — Abdullahi Ahmed
(74) *Attorney, Agent, or Firm* — Danai Nelisile Mhembere; Holland & Hart LLP

(57) ABSTRACT

Methods, systems, and devices for wireless communications are described. A user equipment (UE) may communicate with one or more other UEs over a sidelink communications link, and may perform radio link monitoring (RLM) of the sidelink. A first UE may transmit, to a second UE, a first message in a first transmission time interval (TTI) via a sidelink communication link. The first UE may monitor the sidelink communications link during a second TTI subsequent to the first TTI for a feedback message from the second UE in response to the first message transmitted by the first UE. The monitoring may be a part of a RLM procedure for the sidelink communications link. The first UE may increment a counter based on or an unsuccessful receipt of the feedback message in the second TTI.

24 Claims, 13 Drawing Sheets

(56) References Cited

U.S. PATENT DOCUMENTS

| | | | | |
|---|---|---|---|---|
| 2019/0037479 | A1* | 1/2019 | Suzuki | H04W 72/0446 |
| 2019/0394827 | A1 | 12/2019 | Kim et al. | |
| 2020/0260328 | A1* | 8/2020 | Lee | H04W 88/14 |
| 2020/0383162 | A1* | 12/2020 | Cai | H04W 24/08 |
| 2021/0051673 | A1* | 2/2021 | Chae | H04W 72/0493 |
| 2021/0058833 | A1* | 2/2021 | Basu Mallick | H04L 69/321 |
| 2022/0007227 | A1* | 1/2022 | Zhao | H04L 5/0037 |
| 2022/0174458 | A1* | 6/2022 | Peng | H04L 5/0053 |

OTHER PUBLICATIONS

Apple: "Discussion on SL RLM / RLF Declaration", 3GPP Draft, 3GPP TSG-RAN WG2 Meeting #106, R2-1906773 SL RLM, 3rd Generation Partnership Project (3GPP), Mobile Competence Centre, 650, Route Des Lucioles, F-06921 Sophia-Antipolis Cedex, France, vol. RAN WG2, No. Reno, USA, May 13-May 17, 2019, May 13, 2019 (May 13, 2019), XP051730228, 4 pages, Retrieved from the Internet: URL: http://www.3gpp.org/ftp/Meetings%5F3GPP%5FSYNC/RAN2/Docs/R2%2D1906773%2Ezip. [retrieved on May 13, 2019] pp. 2,3.

Catt: "RLM / RLF Declaration in NR V2X Sidelink", 3GPP Draft, 3GPP TSG-RAN WG2 Meeting #106, R2-1905811, 3rd Generation Partnership Project (3GPP), Mobile Competence Centre, 650, Route Des Lucioles, F-06921 Sophia-Antipolis Cedex, France, vol. RAN WG2, No. Reno, USA, May 13-May 17, 2019, May 13, 2019 (May 13, 2019), XP051729310, 3 Pages, Retrieved from the Internet: URL: http://www.3gpp.org/ftp/Meetings%5F3GPP%5FSYNC/RAN2/Docs/R2%2D1905811%2Ezip, [retrieved on May 13, 2019], Sections 1-2.2.

Huawei, et al., "Sidelink Physical Layer Procedures for NR V2X", 3GPP Draft, 3GPP TSG RAN WG1 Meeting #98, R1-1908040, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26-Aug. 30, 2019, Aug. 17, 2019 (Aug. 17, 2019), XP051764663, 25 Pages, Retrieved from the Internet: URL: http://www.3gpp.org/ftp/tsg_ran/WG1_RL1/TSGR1_98/Docs/R1-1908040.zip, [retrieved on Aug. 17, 2019], p. 3/25.

Interdigital Inc: "RLM/RLF and RRM for NR V2X", 3GPP Draft, 3GPP RAN WG2 Meeting #105, R2-1901579 (R16 V2X SI A11421 RLM_RLF), 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25-Mar. 1, 2019, Feb. 15, 2019 (Feb. 15, 2019), XP051602934, 4 Pages, Retrieved from the Internet: URL: http://www.3gpp.org/ftp/tsg%5Fran/WG2%5FRL2/TSGR2%5F105/Docs/R2%2D1901579%2Ezip, [retrieved on Feb. 15, 2019], Section 2.

International Search Report and Written Opinion—PCT/US2020/046688—ISAEPO—dated Nov. 24, 2020.

Mediatek Inc: "Discussion on SL RLM", 3GPP Draft, 3GPP TSG RAN WG1 #98, R1-1908403 Discussion on SL RLM, 3rd Generation Partnership Project (3GPP), Mobile Competence Centre, 650, Route Des Lucioles, F-06921 Sophia-Antipolis Cedex, France, vol. RAN WG1, No. Prague, Czech, Aug. 26-Aug. 30, 2019, Aug. 17, 2019 (Aug. 17, 2019), XP051765012, 6 Pages, Retrieved from the Internet: URL: http://www.3gpp.org/ftp/tsg_ran/WG_RL1/TSGR1_98/Docs/R1-1908403.zip, [retrieved on Aug. 17, 2019], Sections 2-2.3.

Samsung: "Remaining Issues on SL RLM/RLF Declaration for NR V2X Unicast", 3GPP Draft, 3GPP TSG-RAN WG2 Meeting #107, R2-1911329, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26-Aug. 30, 2019, Aug. 16, 2019 (Aug. 16, 2019), XP051769086, 3 Pages, Retrieved from the Internet: URL: http://www.3gpp.org/ftp/tsg_ran/WG2_RL2/TSGR2_107/Docs/R2-1911329.zip, [retrieved on Aug. 16, 2019], Sections 1-2.2.

* cited by examiner

RADIO LINK MONITORING FOR SIDELINK COMMUNICATIONS

CROSS REFERENCE

The present Application for Patent claims the benefit of U.S. Provisional Patent Application No. 62/893,680 by Wu et al., entitled "RADIO LINK MONITORING FOR SIDELINK COMMUNICATIONS," filed Aug. 29, 2019, assigned to the assignee hereof, and expressly incorporated by reference in its entirety herein.

FIELD OF TECHNOLOGY

The following relates generally to wireless communications and more specifically to radio link monitoring for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, UEs may communicate directly with one another without transmitting through a base station or through a relay point. This communication may be referred to as sidelink, device-to-device (D2D), vehicle-to-vehicle (V2V) communications, or another term for sidelink communications. In sidelink communications, a synchronization signal block (SSB) or channel state information reference signal (CSI-RS) from a transmitter (e.g., a UE) may not be available thus may not be used by a UE for radio link monitoring (RLM) in sidelink configuration.

SUMMARY

The described techniques relate to improved methods, systems, devices, and apparatuses that support radio link monitoring for sidelink communications. Generally, the described techniques provide for a user equipment (UE) monitoring for radio link failure (RLF) in a sidelink communication link. The UE may communicate directly with one or more other UEs in a sidelink communications link. The first UE may transmit a data transmission to the one or more other UEs, and the first UE may monitor for feedback (e.g., hybrid automatic repeat request (HARQ) feedback) from the one or more other UEs. In cases where the HARQ feedback includes a failure, the first UE may increment a counter which the UE may use to determine RLF.

A method of wireless communications at a first UE is described. The method may include transmitting, to a second UE, a first message in a first transmission time interval via a sidelink communications link, monitoring the sidelink communications link during a second transmission time interval subsequent to the first transmission time interval for a feedback message from the second UE in response to the first message transmitted by the first UE, where the monitoring is part of a radio link monitoring procedure for the sidelink communications link, and incrementing, as part of the radio link monitoring procedure, a counter based on or an unsuccessful receipt of the feedback message in the second transmission time interval.

An apparatus for wireless communications at a first UE is described. The apparatus may include a processor, memory coupled with the processor, and instructions stored in the memory. The instructions may be executable by the processor to cause the apparatus to transmit, to a second UE, a first message in a first transmission time interval via a sidelink communications link, monitor the sidelink communications link during a second transmission time interval subsequent to the first transmission time interval for a feedback message from the second UE in response to the first message transmitted by the first UE, where the monitoring is part of a radio link monitoring procedure for the sidelink communications link, and increment, as part of the radio link monitoring procedure, a counter based on or an unsuccessful receipt of the feedback message in the second transmission time interval.

Another apparatus for wireless communications at a first UE is described. The apparatus may include means for transmitting, to a second UE, a first message in a first transmission time interval via a sidelink communications link, monitoring the sidelink communications link during a second transmission time interval subsequent to the first transmission time interval for a feedback message from the second UE in response to the first message transmitted by the first UE, where the monitoring is part of a radio link monitoring procedure for the sidelink communications link, and incrementing, as part of the radio link monitoring procedure, a counter based on an unsuccessful receipt of the feedback message in the second transmission time interval.

A non-transitory computer-readable medium storing code for wireless communications at a first UE is described. The code may include instructions executable by a processor to transmit, to a second UE, a first message in a first transmission time interval via a sidelink communications link, monitor the sidelink communications link during a second transmission time interval subsequent to the first transmission time interval for a feedback message from the second UE in response to the first message transmitted by the first UE, where the monitoring is part of a radio link monitoring procedure for the sidelink communications link, and increment, as part of the radio link monitoring procedure, a counter based on an unsuccessful receipt of the feedback message in the second transmission time interval.

Some examples of the method, apparatuses, and non-transitory computer-readable medium described herein may further include operations, features, means, or instructions for receiving a number of negative feedback messages from the second UE, failing to decode a number of feedback messages from the second UE, incrementing the counter based on a total number of negative feedback messages and the number of feedback messages that failed decoding, and determining a radio link failure for the sidelink communications link based on the counter exceeding a threshold value.

Some examples of the method, apparatuses, and non-transitory computer-readable medium described herein may further include operations, features, means, or instructions for receiving a number of negative feedback messages from the second UE, incrementing the counter based on the number of negative feedback messages, and determining a radio link failure for the sidelink communications link based on the counter exceeding a threshold value.

Some examples of the method, apparatuses, and non-transitory computer-readable medium described herein may further include operations, features, means, or instructions for failing to decode a number of feedback messages from the second UE, incrementing the counter based on the number of feedback messages that failed decoding, and determining a radio link failure for the sidelink communications link based on the counter exceeding a threshold value.

Some examples of the method, apparatuses, and non-transitory computer-readable medium described herein may further include operations, features, means, or instructions for resetting the counter based on a successful decoding of a hybrid automatic repeat request (HARQ) feedback message from the second UE.

Some examples of the method, apparatuses, and non-transitory computer-readable medium described herein may further include operations, features, means, or instructions for receiving a HARQ feedback message prior to a threshold value of the counter, and resetting the counter based on the HARQ feedback message.

Some examples of the method, apparatuses, and non-transitory computer-readable medium described herein may further include operations, features, means, or instructions for monitoring, after incrementing the counter, for one or more feedback messages from the second UE prior to a threshold value of the counter, and determining a radio link failure for the sidelink communications link based on none of the one or more feedback messages from the second UE being successfully received after the threshold value of the counter is satisfied.

In some examples of the method, apparatuses, and non-transitory computer-readable medium described herein, the threshold value of the counter may be determined during establishment of the sidelink communications link may be based on a speed of the first UE or the second UE, a congestion level of the sidelink communications link, the priority level associated with data of the first message transmitted via the sidelink communications link, an application for which the sidelink communications link may be used, or a combination thereof.

Some examples of the method, apparatuses, and non-transitory computer-readable medium described herein may further include operations, features, means, or instructions for determining an upper bound and a lower bound for the threshold value of the counter, where the upper bound and the lower bound may be based on preconfigured values, a priority level associated with data of the first message transmitted via the sidelink communications link, an application for which the sidelink communications link may be used, or a combination thereof.

Some examples of the method, apparatuses, and non-transitory computer-readable medium described herein may further include operations, features, means, or instructions for reconfiguring the threshold value of the counter based on a change in speed of the first UE or the second UE, a congestion level of the sidelink communications link, a change in a priority level associated with data transmitted via the sidelink communications link, or a combination thereof.

Some examples of the method, apparatuses, and non-transitory computer-readable medium described herein may further include operations, features, means, or instructions for determining a threshold value for the counter based on a preconfigured threshold value, a value determined during establishment of the sidelink communications link, a priority level associated with data of the first message transmitted via the sidelink communications link, an indication from a base station, or a combination thereof.

In some examples of the method, apparatuses, and non-transitory computer-readable medium described herein, the value for the counter may be determined during establishment of the sidelink communication channel via radio resource control (RRC) signaling.

Some examples of the method, apparatuses, and non-transitory computer-readable medium described herein may further include operations, features, means, or instructions for determining a radio link failure for the sidelink communications link based on the counter exceeding the threshold value for the counter.

Some examples of the method, apparatuses, and non-transitory computer-readable medium described herein may further include operations, features, means, or instructions for determining the unsuccessful receipt of the feedback message based on failing to successfully decode the feedback message in the second transmission time interval or in one or more subsequent feedback occasions.

DETAILED DESCRIPTION

Figure 1:
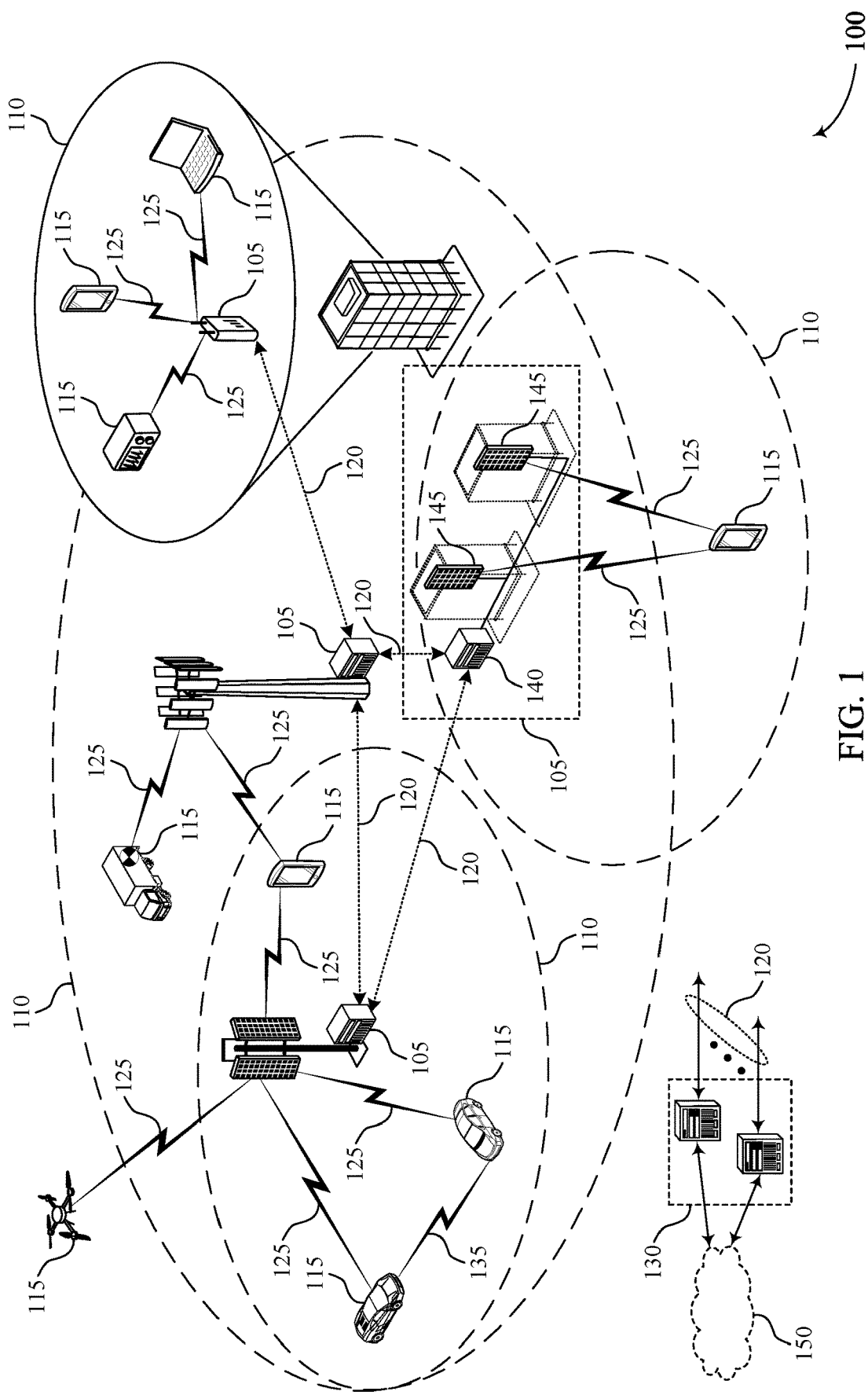
FIG. 1 illustrates an example of a wireless communications system in accordance with aspects of the present disclosure.

In some cases of a wireless communications system, a user equipment (UE) and a base station may communicate over radio links. The UE or the base station may monitor the radio link to check for radio link failure (RLF). The UE or the base station may monitor for RLF by monitoring particular signals in a channel. For example, in the case of 5G NR downlink, a UE may measure synchronization signal blocks (SSBs) or the channel state information reference signal (CSI-RS) for radio link monitoring (RLM).

In other cases, one or more UEs may communicate directly with one another in sidelink communication channels. This communication configuration may in some cases not include one UE relaying messages to other UEs through a base station. A sidelink communications configuration may be an example of device-to-device (D2D) communication, vehicle-to-vehicle (V2V) communication, or another example of sidelink communication in an Internet-of-Everything (IoE) communications system.

In cases of sidelink communication, RLM by measuring SSBs and the CSI-RS of channels (as in cellular link or base station to UE communications) may not be performed as reliably, because multiple UEs may utilize the same SSB. Thus, measurements on the SSB may not correspond correctly to the intended sidelink channel or UE. Further, SSB transmission may be decoupled from data transmission, which may mean that a UE transmitting data may not also transmit an SSB. CSI-RS may also not be present in sidelink communication channels, and thus a UE may not rely on CSI-RS in sidelink communicating for RLM.

RLM may be performed at a UE transmitting data in a sidelink communications configuration by monitoring for and detecting hybrid automatic repeat request (HARQ) feedback (such as an acknowledgment (ACK) or a negative acknowledgment (NACK)). For example, a first UE may transmit a data packet to a second UE, and the first UE may then monitor for a HARQ response from the second UE including an ACK/NACK indicating the status of the reception of the message by the second UE.

RLM may be performed in unicast and multicast sidelink scenarios. In a unicast configuration, RLM may be performed to determine if the connection between two UEs communicating over a sidelink fails or does not fail. RLM may also be performed in a groupcast sidelink scenario, where one UE may transmit the same data transmission to more than one other UEs in a sidelink. In groupcast, RLM may be performed to determine if any of the one-to-many connections between the UE transmitting the data and the UEs receiving the data fails or does not fail. A failure in either the unicast configuration or the groupcast configuration may be a RLF.

In a sidelink communications system, a first UE may transmit a message (e.g., a data packet) over a sidelink channel to one or more other UEs. The UE may monitor for an ACK/NACK from a receiving UE in a particular transmission time interval (TTI) (e.g., a slot). In some cases, the first UE may determine that a HARQ feedback failure has occurred in the particular TTI (e.g., a slot). To perform RLM, the first UE may initiate a counter (e.g., a timer) in the TTI corresponding to the expected transmission of the ACK/NACK from the receiving UE. RLF may be declared by the first UE when the counter counts to a threshold number of failures, or if a successful HARQ feedback is not received by the time that a timer counts to zero. The expiration of the counter may correspond to consecutive failure of HARQ feedback from the receiving UE. Failure of HARQ feedback may occur due to failure of HARQ feedback transmission by the receiving UE, failure of HARQ feedback decoding by the transmitting UE, or if the transmitting UE receives the HARQ feedback, successfully decodes it, and determined that the HARQ feedback is a NACK.

Thus, a UE may conduct RLM based on HARQ feedback detection to enable RLF in a sidelink communications system without SSBs or CSI-RS. The UE may declare RLF, and may then take actions to recover the connection to resolve the RLF. The UE may then re-establish the connection between the UE and the receiving UE.

Aspects of the disclosure are initially described in the context of wireless communications systems. Aspects of the disclosure are further described in the context of slot diagrams and process flows. Aspects of the disclosure are further illustrated by and described with reference to apparatus diagrams, system diagrams, and flowcharts that relate to radio link monitoring for sidelink communications.

FIG. 1 illustrates an example of a wireless communications system 100 that supports radio link monitoring for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

One or more UEs 115 may communicate directly with one another over communication links in a sidelink communication configuration. A UE 115 may perform RLM over the communication links with one or more other UEs 115. RLM over a cellular link between a base station 105 and a UE 115 may generally include monitoring of an SSB transmitted by the UE 115 or the base station 105, or measurement of the radio link using a CSI-RS transmitted by the UE 115 or the base station 105. SSBs and CSI-RS may not be available or reliable in sidelink communications between one or more UEs 115.

Thus, a UE 115 may perform RLM in a sidelink configuration my monitoring for HARQ feedback from other UEs 115 based on a data transmission by the UE 115. In one case, based on a first HARQ feedback failure, the UE 115 may initiate a counter to quantify the number of HARQ feedback failures corresponding to a number of HARQ feedback failures. The UE 115 may increment the counter for each received HARQ feedback failure. When the counter a threshold value, the UE 115 may declare RLF in the sidelink channel. In one example, the UE 115 may initiate actions to reconnect with the one or more other UEs 115.

In another case, based on a first HARQ feedback failure, the UE 115 may initiate a timer to quantify the amount of time corresponding to a number of HARQ feedback failures. The timer may continue to time throughout each received HARQ feedback failure. When the timer reaches a threshold value, the UE 115 may declare RLF in the sidelink channel. In some cases, the UE 115 may initiate actions to reconnect with the one or more other UEs 115.

Figure 2:
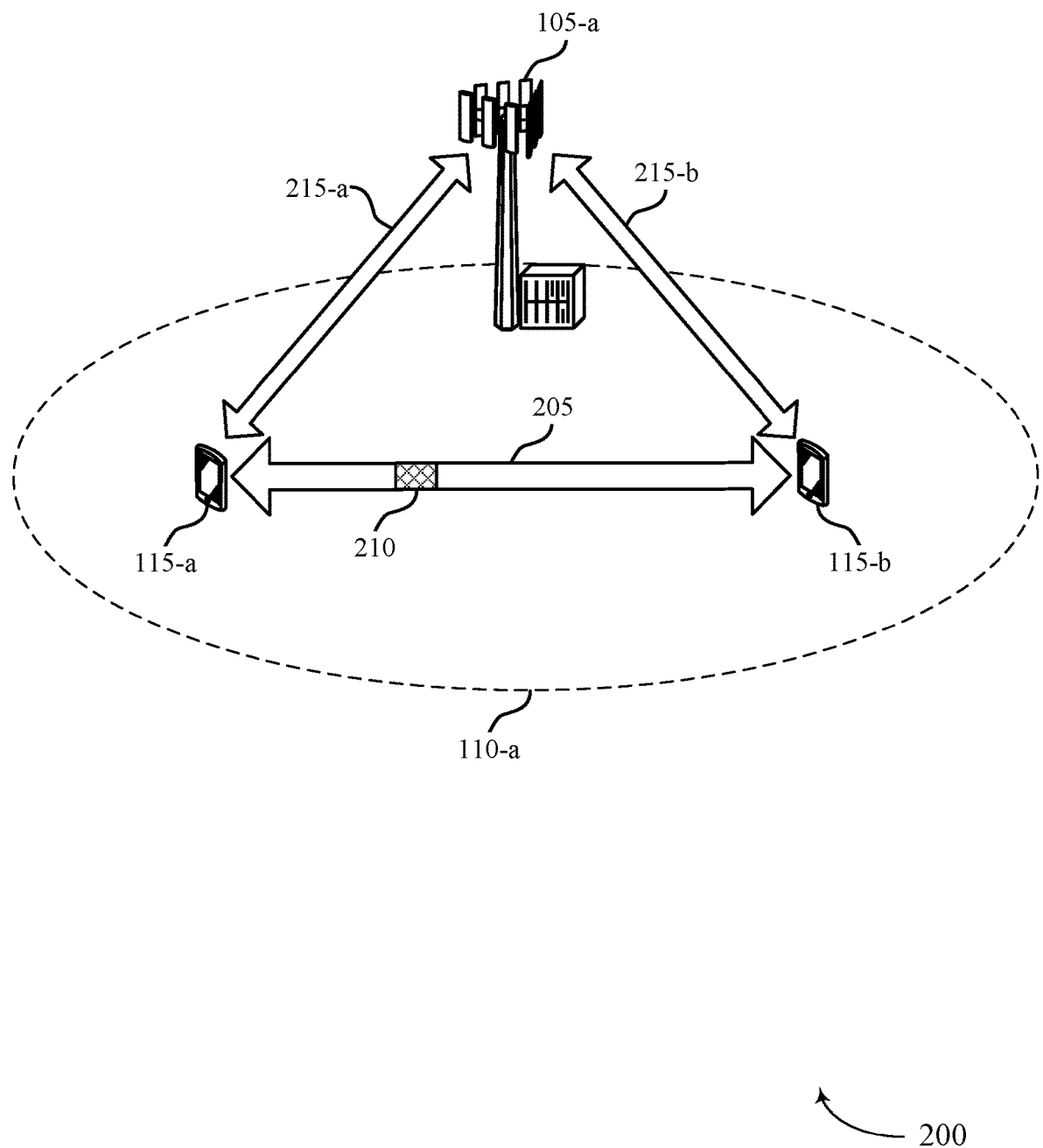
FIG. 2 illustrates an example of a wireless communications system in accordance with aspects of the present disclosure.

FIG. 2 illustrates an example of a wireless communications system 200 that supports radio link monitoring for sidelink communications in accordance with aspects of the present disclosure. In some examples, wireless communications system 200 may implement aspects of wireless communication system 100. Wireless communications system 200 may include base station 105-*a* and UEs 115-*a* and 115-*b*. Base station 105-*a* may be an example of a base station 105 as described with respect to FIG. 1. UEs 115-*a* and 115-*b* may be examples of UEs 115 as described with respect to FIG. 1. Base station 105-*a* may serve one or more UEs 115 within coverage area 110-*a*. Base station 105-*a* may communicate with the one or more UEs 115 via communication links 215. UE 115-*a* and UE 115-*b* may be connected in a sidelink communication configuration, and may communicate over sidelink channel 205. Wireless communications system 200 may show an example of a unicast sidelink configuration, but the RLM technique described herein may also apply in a multicast or broadcast sidelink configuration.

UE 115-*a* may transmit, over sidelink channel 205, a first message 210. Message 210 may be transmitted by UE 115-*a* in a first TTI (e.g., in a slot N). Based on the transmission of the first message 210, UE 115-*a* may expect to receive HARQ feedback, such as an ACK/NACK message, from UE 115-*b*. UE 115-*a* may monitor for HARQ feedback in a second TTI (e.g., slot N+K). Based on the monitoring for HARQ feedback in the second TTI, UE 115-*a* may initiate a counter (e.g., a timer) which may count a number of successive HARQ feedback failures. When the counter counts to a threshold number of HARQ failures, or the timer counts down to zero, UE 115-*a* may declare RLF.

Sidelink channel 205 may be an example of a sidelink communications link. A sidelink communications link may include one or more channels. For example, UE 115-*a* may transmit message 210 in a physical sidelink shared channel (PSSCH). UE 115-*b* may transmit HARQ feedback in a physical sidelink shared channel (PSFCH)

In some cases, UE 115-*a* may receive an ACK from UE 115-*b* over sidelink channel 205 in the expected TTI, and correctly decode the ACK. In other cases, there may be a failure in HARQ feedback from UE 115-*b*. The HARQ feedback failure may be due to one or more causes. In one case, UE 115-*b* may transmit a NACK to UE 115-*a*. In some cases, UE 115-*a* may expect HARQ feedback from UE 115-*b*, but UE 115-*a* may not be able to decode the feedback. This may qualify as a HARQ feedback failure. In other cases, UE 115-*a* may correctly decode the feedback, but the feedback may be a NACK. The NACK may also qualify as a HARQ feedback failure.

UE 115-*a* may initiate the counter or timer in slot N+K if the HARQ feedback is not received in the slot N+K. If HARQ feedback is not received in slot N+K or in another, later slot, before the counter meets a threshold or the timer counts to zero, UE 115-*a* may declare RLF. If HARQ feedback is received before a threshold value of the counter is reached (or before expiration of a timer), UE 115-*a* may reset the counter or timer. UE 115-*a* may restart the counter or timer at the next instance of failed HARQ feedback in a slot.

In cases where UE 115-*a* declares RLF of sidelink 205 based on the counter or timer reaching a threshold value, UE 115-*a* may perform actions to reestablish connection with UE 115-*b*. This may involve communications with base station 105-a over link 215-a to reestablish contact with UE 115-b over communication link 215-b.

The counter (or the timer associated with the counter) started by UE 115-a based on the monitoring for the HARQ feedback may have a specified threshold value that is determined based on one or more parameters. In some cases, the counter may have a common preconfigured threshold value (e.g., common to one or more UEs 115, cells, or base stations 105). The preconfigured threshold value may be based on a wireless communication standard. For example, the preconfigured threshold value may determined based on information elements (IEs) (e.g., SL-preconfigruationNR IEs, including sl-MaxNumConsecutiveDTX-r16).

In other cases, the threshold value of the counter may be negotiated between UE 115-a and UE 115-b during the establishment of the sidelink connection for example (e.g., via RRC signaling), using IEs. The counter value may be negotiated based on or more of UE communication parameters, such as speed of a UE 115 (speed of UE 115-a, speed of UE 115-b, or relative speed between UEs 115-a and 115-b), congestion level, data priority, application type, or another communication parameter.

In some cases, the threshold value may be configured at UE 115-a based on signaling from base station 105-a or other device (e.g., UE 115-b or another UE 115). For example, base station 105-a may transmit a system information block (SIB) message indication the threshold value (e.g., sl-maxNumConsecutiveDTX). The SIB message may include RRC signaling. In other cases, the threshold value may be indicated to UE 115-a in an IE (e.g., SL-ConfigDedicatedNR IE).

For example, the counter or timer may have a greater value in cases where the congestion level is lower. The congestion level may be measured based on a channel quality measurement, such as reference signal receive power (RSRP), reference signal received quality (RSRQ), channel busy ratio (CBR), or another congestion measurement. The congestion measurement may be determined by UE 115-a, UE 115-b, and negotiated between UEs 115-a and 115-b. In other cases, the congestion measurement may be signaled to one or both of UEs 115-a and 115-b by base station 105-a based on measurements performed by or signaled to base station 105-a. The congestion measurement may then be mapped to a timer value.

The counter or timer may also be mapped based on the data priority. For example, the counter may have a greater value if the data priority is lower. The data priority may be based on a relative priority of the message transmitted from the transmitting UE to the receiving UE in comparison to other data transmissions by the transmitting UE or other communications within the system. The counter may also have a smaller value if the data transmission is for a safety message transmission. The safety message transmission may be an example of a high priority message.

The counter or timer may also have a value within a specified range, rather than have a distinct value. The counter value range which may have an upper bound and a lower bound. The bound may be predefined or preconfigured (e.g., based on a wireless communications standard or control signaling from a base station, or both). The range may also be negotiated between UE 115-a and UE 115-b in the sidelink system. The range of the counter value may depend on data priority or the type of application of the data transmission. For example, if the data type is a high priority safety message, the counter may still have a range of values, but the upper bound of the range of values for the timer may be smaller, so that the counter has a smaller value.

The value of the counter or timer may be indicated by a network node (e.g., a base station). This may apply in cases where the sidelink communication is scheduled by the base station. For example, the base station may select the counter value based on the UE speed or congestion level. The UE speed or congestion level may be reported to the base station by one or more UEs.

The counter or timer may be activated based on UE 115-a monitoring particular TTIs for HARQ feedback from UE 115-b. The counter may increment each time a HARQ feedback failure is detected by UE 115-a. The counter may increment until a threshold number of HARQ feedback failures occurs, at which point UE 115-b may declare RLF. In other cases, the counter may be or correspond to a timer, which may count down based on the value of the timer. The value of the timer may be determined based on the same parameters as the value of the counter (e.g., pre configuration, UE speed, congestion level, application type, data priority, etc.).

Figure 3A:
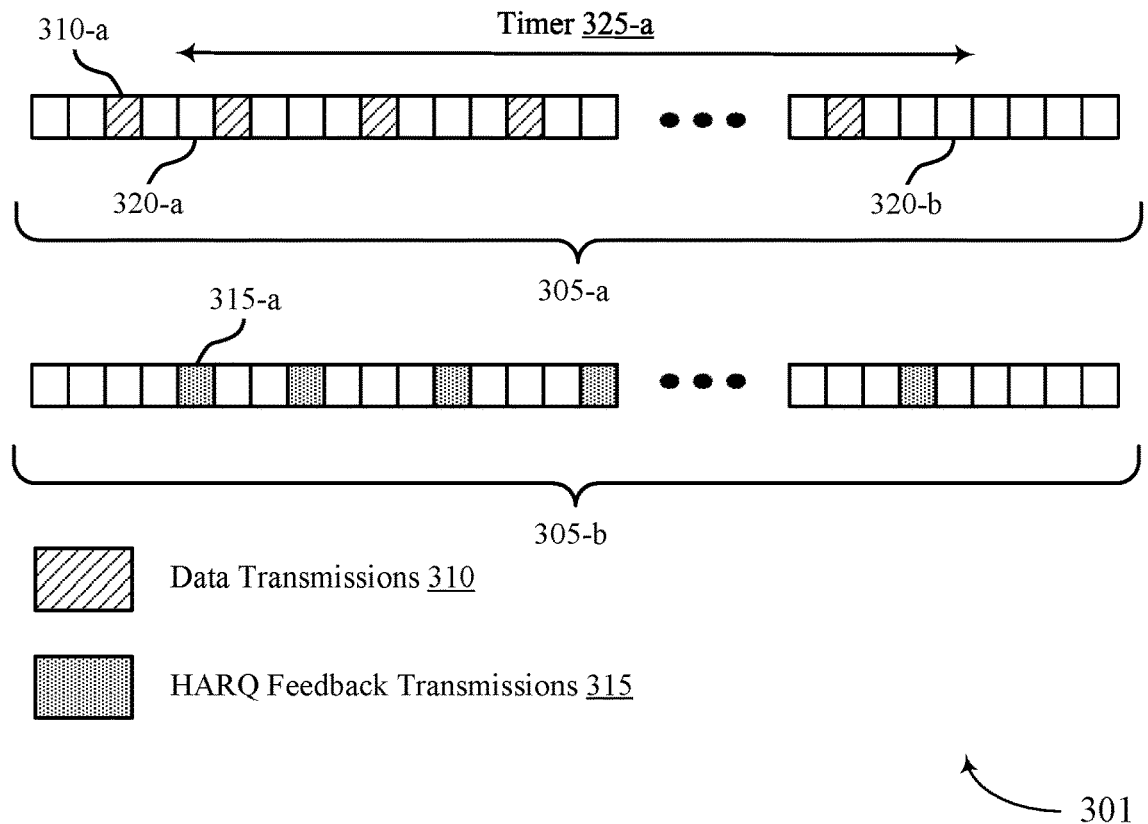
FIGS. 3A and 3B illustrate examples of slot diagrams in accordance with aspects of the present disclosure.

FIG. 3A illustrates an example of a slot diagram 301 that supports radio link monitoring for sidelink communications in accordance with aspects of the present disclosure. In some examples, slot diagram 301 may implement aspects of wireless communication systems 100 and 200. UEs 115 operating in a sidelink configuration may receive and transmit messages based on slot diagram 301. A first transmitting UE 115 (e.g., UE 115-a as described with respect to FIG. 2) may transmit data transmissions 310 according to configuration 305-a. Configuration 305-a may be an example of a PSSCH. A second receiving UE 115 (e.g., UE 115-b) may transmit HARQ feedback transmissions 315 based on configuration 305-b. Configuration 305-b may be an example of a PSFCH. A timer 325-a may be initiated by a transmitting UE 115 (e.g., UE 115-a) based on monitoring for HARQ feedback transmissions 315 received from a receiving UE 115 (e.g., UE 115-b).

A first UE 115 (e.g., UE 115-a) may transmit data transmission 310 in particular slots according to transmission configuration 305-a. For example, a UE 115 may transmit a first data transmission 310-a. Data transmission 310-a may correspond to a particular slot or TTI N. Data transmission 310-a may be transmitted in a sidelink communications channel (e.g., sidelink channel 205) to a second UE 115. Based on transmitting data transmission 310-a, the first UE 115 may monitor for HARQ feedback transmission 315-a from the second UE 115 in slot 320-a.

In some cases, HARQ feedback transmission 315-a may correspond to a HARQ feedback failure. The HARQ feedback failure may be because the HARQ feedback transmission 315-a is decoded by the first UE and is a NACK transmission. In other cases, a HARQ feedback failure may be that HARQ feedback transmission 315-a is not be decoded correctly at the first UE 115. In any case of HARQ feedback failure, the first UE 115 may initiate a timer 325 based on the HARQ feedback failure.

For example, HARQ feedback failure may occur in slot 320-a. Based on this failure, the first UE 115 may initiate timer 325-a. The timer 325-a may have a length of time based on pre-configuration, or based on one or more parameters, such as data priority, speed of the first or second UE, congestion level, or another UE parameter. Timer 325-a may count down for the configured length of time until the threshold time period (either counting down to zero or counting up to a configured time) or until HARQ feedback is successfully received.

If the timer 325-*a* counts down to zero before the HARQ feedback is successfully received by the first UE 115, the first UE 115 may declare that a RLF has occurred.

Figure 3B:
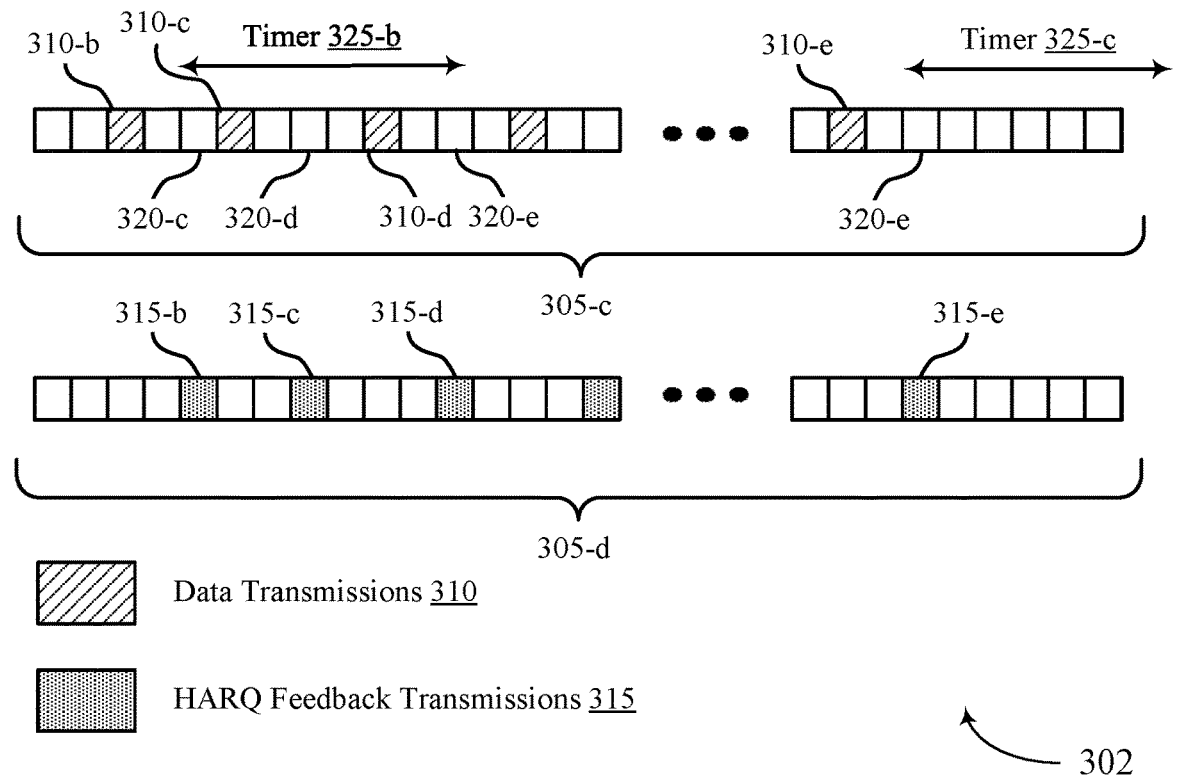

Alternatively, HARQ feedback may be received before the expiration of a timer. FIG. 3B illustrates an example of a slot diagram 302 that supports radio link monitoring for sidelink communications in accordance with aspects of the present disclosure. In some examples, slot diagram 301 may implement aspects of wireless communication systems 100 and 200. UEs 115 operating in a sidelink configuration may receive and transmit messages based on slot diagram 302. A first, transmitting UE 115 (e.g., UE 115-*a* as described with respect to FIG. 2) may transmit data transmissions 310 according to configuration 305-*c*. Configuration 305-*c* may be an example of a PSSCH. A second, receiving UE 115 (e.g., UE 115-*b*) may transmit HARQ feedback transmissions 315 based on configuration 305-*d*. Configuration 305-*c* may be an example of a PSFCH. A Timer 325-*b* may be initiated by a transmitting UE 115 (e.g., UE 115-*a*) based on monitoring for HARQ feedback transmissions 315 received from a receiving UE 115 (e.g., UE 115-*b*).

A first UE 115 (e.g., UE 115-*a*) may transmit data transmission 310 in particular slots according to transmission configuration 305-*c*. For example, a UE 115 may transmit a first data transmission 310-*b*. Data transmission 310-*b* may correspond to a particular slot N. Data transmission 310-*b* may be transmitted in a sidelink communications channel (e.g., sidelink channel 205) to a second UE 115. Based on transmitting data transmission 310-*b*, the UE 115 may monitor for HARQ feedback transmission 315-*b* from the second UE 115 in slot 320-*b* (e.g., slot N+K).

The first UE 115 may not receive expected HARQ feedback in slot 320-*c* due to a HARQ feedback failure. Based on this failure, the first UE 115 may initiate timer 325-*b* may count down to zero until interrupted by successful HARQ feedback. The length of timer 325-*b* may be determined by one or more parameters. As the timer counts down, the first UE 115 may also transmit another data transmission 310-*c*, and may expect a HARQ feedback in slot 320-*d* based on HARQ feedback transmission 315-*c* from the second UE 115. The first UE 115 may also not correctly receive HARQ feedback transmission 315-*c* in slots 320-*d* (or the HARQ feedback transmission 315-*c* is a NACK), and timer 325-*b* may continue to count down. The first UE 115 may transmit another data transmission 310-*d* to the second UE 115 over the sidelink communications channel. The second UE 115 may transmit HARQ feedback transmission 315-*d* to the first UE 115 over the sidelink channel. The first UE 115 may receive the HARQ feedback in slot 320-*e*, and may successfully decode the HARQ feedback, which may be an ACK. The HARQ feedback transmission 315-*d* may therefore be a successful HARQ feedback transmission. Based on this success, the first UE 115 may reset timer 325-*b* and may not declare RLF.

The first UE 115 may re-initiate the timer 325 in later cases of HARQ feedback failure. For example, the first UE 115 may, at a later point in time, transmit data transmission 310-*e*. Based on this data transmission, the first UE may monitor slot 320-*f* for an expected HARQ feedback transmission 315-*e*. In some cases, the first UE may receive the HARQ feedback transmission 315-*e*, successfully decode it, and determine that HARQ feedback transmission 315-*e* contained an ACK. In other cases, the first UE 115 may not receive HARQ feedback transmission 315-*e*, or may receive HARQ feedback transmission 315-*e* and not be able to decode it, or may be able to decode it and may determine that is contains a NACK. In any of these cases, the first UE 115 may determine that HARQ feedback transmission 315-*e* contains a failure, and the first UE 115 may thus initiate a timer 325-*c*, which may count to a threshold time length unless a HARQ feedback transmission is a successful transmission.

Timer 325-*c* may have the same timer value as timer 325-*b*, or may have a different value. Timer 325-*c* may have a different value in cases where a timer reconfiguration occurs. Renegotiation or reconfiguration of a timer 325 may occur in cases where one or more UE parameters has changed since a previous renegotiation of the timer. Renegotiation of the timer may correspond to an increase or decrease in timer value.

For example, one or both of the first UE 115 and the second UE 115 may change speed. The UE speed or relative speed between the UEs may change from a high-speed category to a mid-speed category, which may necessitate a timer value change. Or, the relative UE speed may exceed satisfy a higher or lower threshold boundary, which may also cause a renegotiation of the timer value.

Congestion level may also change within the communication system which may impact the renegotiation of the timer. For example, first or second UEs 115 may monitor RSRQ of the communication channel, and may determine that the RSRQ satisfies (e.g., exceeds a threshold). This may cause a renegotiation of the timer.

In another case, data priority of the data transmission 310 may change. In these cases, a timer 325 may have a determined value based on one data priority of a first data transmission 310. When the data priority changes, the value of the timer may increase (e.g., in cases where the priority decreased) or the value of the timer may decrease (e.g., in cases where the priority increased).

In other cases, a serving base station 105 may indicate to the one or more UEs 115 to change the timer value. This indication may be based on a changed parameter detected or signaled to the base station by one of the UEs 115 communicating over sidelink, or from another UE 115.

Any of the causes of timer negotiation may initiate a timer renegotiation at the first UE. In some cases, the value of the timer may be indicated to the UE by a base station. In other cases, the UE may determine to change the timer 325 without input from the base station.

In other cases, a first UE 115 may monitor HARQ feedback failures, according to a counter that counts the number of failures rather than a timer that counts down until a successful HARQ feedback occurs.

Figure 4A:
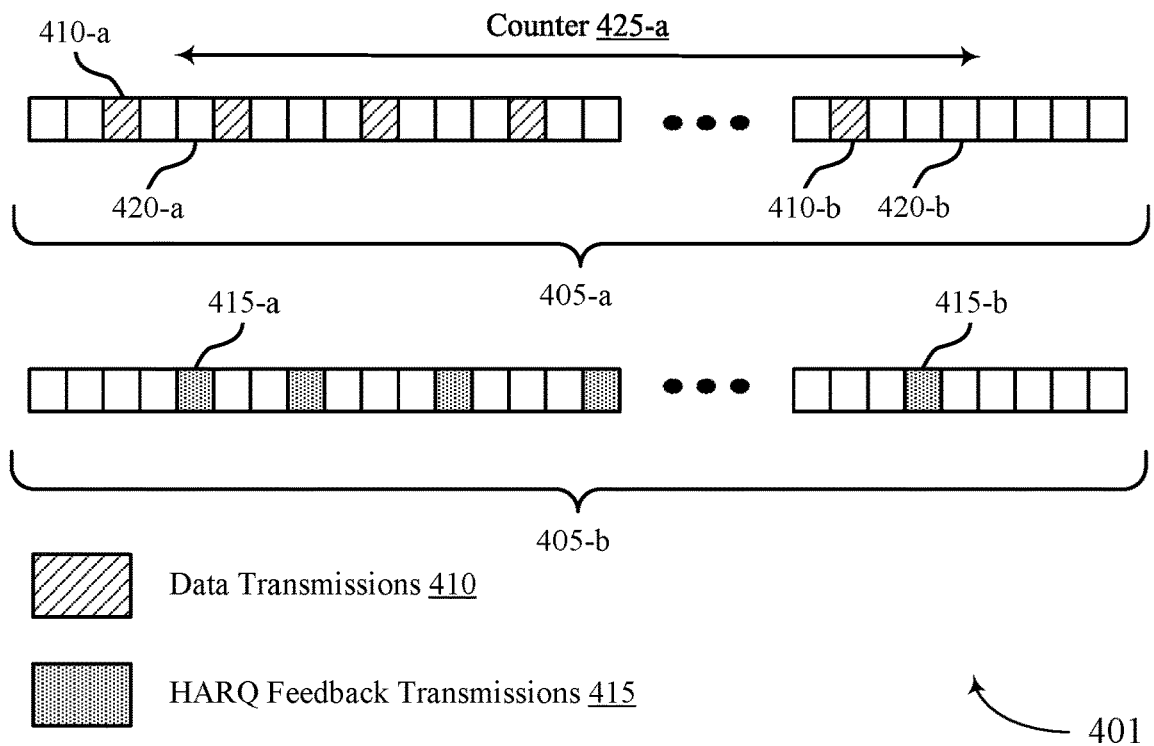
FIGS. 4A and 4B illustrate examples of slot diagrams in accordance with aspects of the present disclosure.

FIG. 4A illustrates an example of a slot diagram 401 that supports radio link monitoring for sidelink communications in accordance with aspects of the present disclosure. In some examples, slot diagram 401 may implement aspects of wireless communication systems 100 and 200. Slot diagram 401 may be an example of communications of one or more UEs 115 communicating in a sidelink configuration. A UE 115 transmitting data transmission to another UE 115 may count a number of (e.g., one or more) successive HARQ feedback failures according to a counter 425. UEs 115 operating in a sidelink configuration may receive and transmit messages based on slot diagram 401. A transmitting UE 115 (e.g., UE 115-*a* as described with respect to FIG. 2, or the first UE as described with respect to FIGS. 3A and 3B) may transmit data transmissions 410 according to example slot configuration 405-*a*. Configuration 405-*a* may be an example of a PSSCH. A receiving UE 115 (e.g., UE 115-*b* as described with respect to FIG. 2, or the second UE 115 as described with respect to FIGS. 3A and 3B) may transmit HARQ feedback transmissions 415 based on configuration 405-*b*. Configuration 405-*b* may be an example of a PSFCH. Counter 425-*a* may be initiated by a first transmitting UE 115 (e.g., UE 115-*a*) based on monitoring for HARQ feedback transmissions 415 received from a second receiving UE 115 (e.g., UE 115-*b*).

A first UE 115 (e.g., UE 115-*a*) may transmit data transmission 410 in particular slots according to transmission configuration 405-*a*. For example, a UE 115 may transmit a first data transmission 410-*a*. Data transmission 410-*a* may correspond to a particular slot N. Data transmission 410-*a* may be transmitted in a sidelink communications channel (e.g., sidelink channel 205) to a second UE 115. Based on transmitting data transmission 410-*a*, the UE 115 may monitor for HARQ feedback transmission 415-*a* from the second UE 115 in slot 420-*a* (e.g., slot N+K).

In some cases, HARQ feedback transmission 415-*a* may correspond to a HARQ feedback failure. The HARQ feedback failure may be because the HARQ feedback transmission 415-*a* was a NACK transmission. In other cases, a HARQ feedback failure may be that HARQ feedback transmission 415-*a* may not be decoded correctly at the first UE 115 (regardless of whether it was an ACK or a NACK). In any case of HARQ feedback failure, the first UE 115 may initiate or increment a counter 425 based on the HARQ feedback failure.

For example, HARQ feedback failure may occur in slot 420-*a*. Based on this failure, the first UE 115 may initiate or increment counter 425-*a*. Counter 425-*a* may have a preconfigured number of failures to count up to based on one or more parameters, such as data priority, speed of the first or second UE, congestion level, or another UE parameter. Counter 425-*a* may increment each time a HARQ feedback failure occurs until a HARQ feedback success occurs or until the preconfigured threshold number of counts is reached.

If counter 425-*a* counts to threshold number of failures before the HARQ feedback is successfully received by the first UE 115, the first UE 115 may declare that a RLF has occurred. For example, counter 425-*a* may be configured for five counts. The first UE 115 may monitor slot 420-*b* for a HARQ feedback transmission 415-*b* based on data transmission 410-*b*. Slot 420-*b* may be the fifth slot in which the UE 115 has monitored for a HARQ feedback transmission 415 from the second UE 115. A fifth HARQ failure may occur in slot 420-*b*. At this point, counter 425-*a* may have reached a threshold number of counts for the particular counter value. Thus, the first UE 115 may declare RLF, and may proceed with steps to resolve the RLF and recover sidelink communications with the second UE.

Figure 4B:
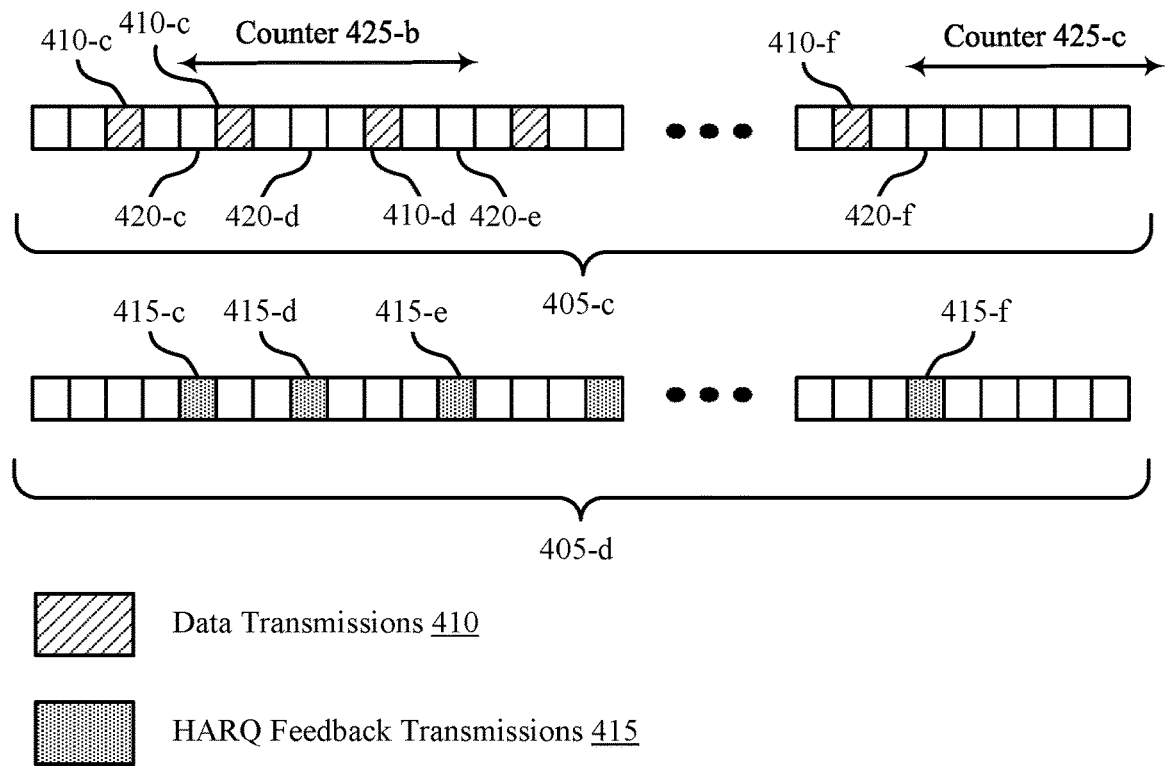

Alternatively, HARQ feedback may be received before the counter 425 reaches the threshold. FIG. 4B illustrates an example of a slot diagram 402 that supports radio link monitoring for sidelink communications in accordance with aspects of the present disclosure. In some examples, slot diagram 402 may implement aspects of wireless communication systems 100 and 200. UEs 115 operating in a sidelink configuration may receive and transmit messages based on slot diagram 402. A first, transmitting UE 115 may transmit data transmissions 410 according to configuration 405-*c*. Configuration 405-*c* may be an example of a PSSCH. A second, receiving UE 115 may transmit HARQ feedback transmissions 415 based on configuration 405-*d*. Configuration 305-*c* may be an example of a PSFCH. Counter 425-*b* may be initiated by a first, transmitting UE 115 (e.g., UE 115-*a*) based on monitoring for HARQ feedback transmissions 415 received from a second, receiving UE 115.

The first UE 115 (e.g., UE 115-*a*) may transmit data transmission 410 in particular slots according to transmission configuration 405-*c*. For example, a UE 115 may transmit a first data transmission 410-*c*. Data transmission 410-*c* may correspond to a particular slot N. Data transmission 410-*c* may be transmitted in a sidelink communications channel (e.g., sidelink channel 205) to a second UE 115. Based on transmitting data transmission 410-*c*, the UE 115 may monitor for HARQ feedback transmission 415-*c* from the second UE 115 in slot 420-*c* (e.g., slot N+K).

The first UE may not detect expected HARQ feedback in slot 420-*c* due to a HARQ feedback failure. Based on this failure, the first UE 115 may initiate counter 425-*b*. For example, the first UE 115 may start counting the counter from an initial value (e.g., an initial value of 0). Counter 425-*b* may increment each time a HARQ feedback failure occurs, unless interrupted by an instance of successful HARQ feedback. The first UE 115 may also transmit another data transmission 410-*c*, and may expect a HARQ feedback in slot 420-*d* based on HARQ feedback transmission 415-*d* from the second UE 115. The first UE 115 may also not detect HARQ feedback transmission 415-*d* in slot 420-*d*, and counter 425-*b* may increment based on this failure. The first UE 115 may transmit another data transmissions 410-*d* to the second UE 115 over the sidelink communications channel. The second UE 115 may transmit HARQ feedback transmission 415-*e* to the first UE 115 over the sidelink channel. The first UE 115 may receive the HARQ feedback in slot 420-*e*, and may successfully decode the HARQ feedback, which may be an ACK. The HARQ feedback transmission 415-*e* may therefore be a successful HARQ feedback transmission. Based on this success, the first UE 115 may reset counter 425-*b* and may not declare RLF.

The first UE 115 may re-initiate the counter 425 in later cases of HARQ feedback failure. For example, the first UE 115 may reset the counter to an initial value, and start counting the counter from the initial value. The initial value may be zero. The first UE 115 may, at a later point in time, transmit data transmission 410-*f*. Based on this data transmission, the first UE may monitor slot 420-*f* for an expected HARQ feedback transmission 415-*f*. In some cases, the first UE may receive the HARQ feedback transmission 415-*f*, successfully decode it, and determine that HARQ feedback transmission 415-*f* contained an ACK. In this case, the first UE 115 may not initiate or increment a counter 425. In other cases, the first UE 115 may not receive HARQ feedback transmission 415-*f*, or may receive HARQ feedback transmission 415-*f* and not be able to decode it, or may be able to decode it and may determine that is contains a NACK. In any of these cases, the first UE 115 may determine that HARQ feedback transmission 415-*f* includes a HARQ feedback failure, and the first UE 115 may thus initiate or increment counter 425-*c*.

Counter 425-*c* may have the same timer value as counter 425-*b*, or may have a different value. Counter 425-*c* may have a different value in cases where a timer reconfiguration occurs. Renegotiation or reconfiguration of a counter 425 may occurs in cases where one or more UE parameters has changed since a previous renegotiation of the timer. Renegotiation of the counter may correspond to an increase or decrease in timer value.

Figure 5:
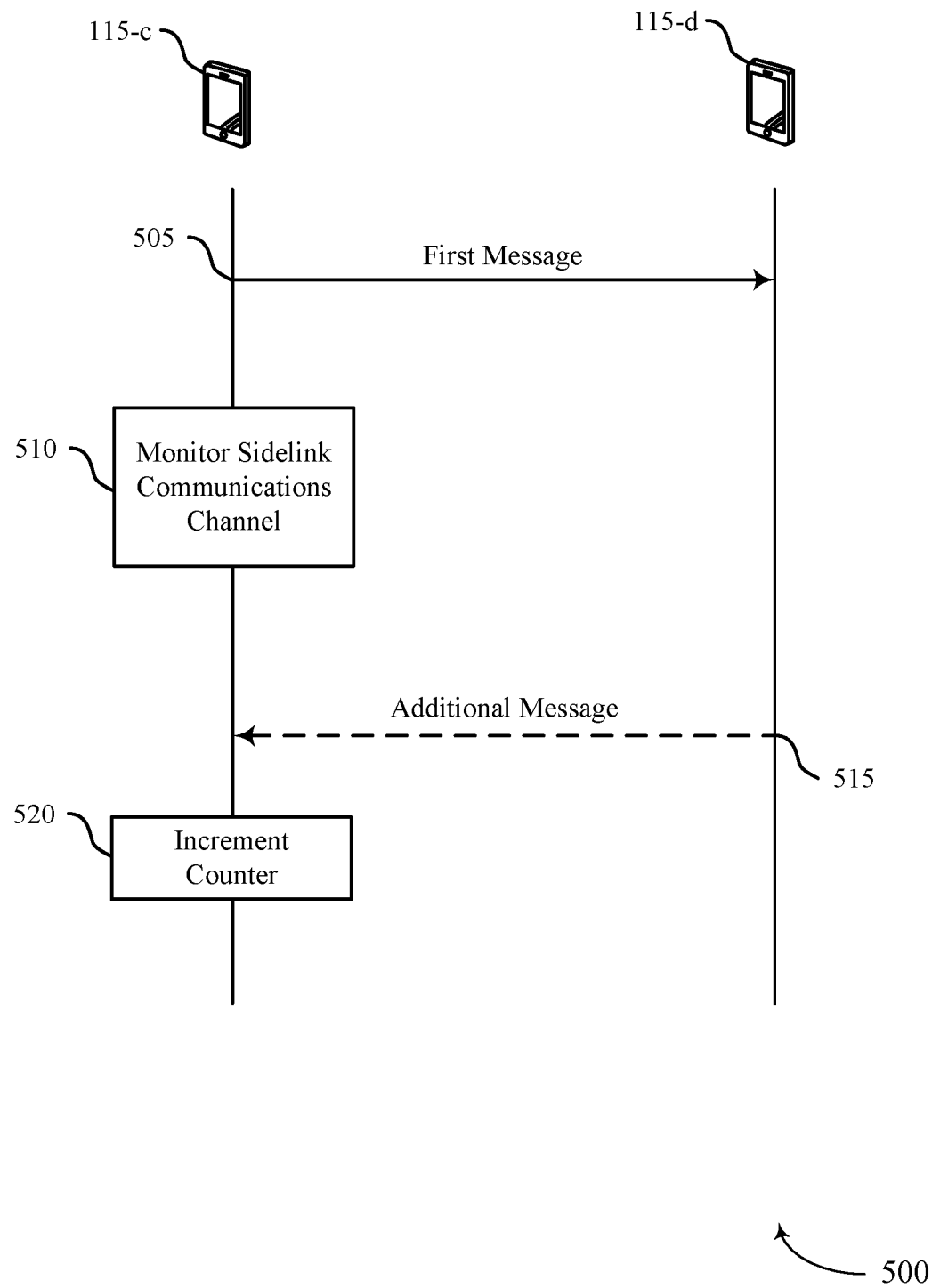
FIG. 5 illustrates an example of a process flow in accordance with aspects of the present disclosure.

FIG. 5 illustrates an example of a process flow 500 that supports radio link monitoring for sidelink communications in accordance with aspects of the present disclosure. In some examples, process flow 500 may implement aspects of wireless communication systems 100 and 200, as well as slot diagrams 301, 302, 401, and 402. Process flow 500 may include UE 115-*c* and UE 115-*d*, both of which may be examples of UEs 115 as described with respect to FIGS. 1-4. UE 115-*c* may be an example of a first transmitting UE 115, and UE 115-*d* may be an example of a second receiving UE 115. UEs 115-*c* and 115-*d* may be configuration in a sidelink communication system, and may communicate over a sidelink communications link. UE 115-*c* may perform RLM by detecting HARQ feedback failures from UE 115-*d*.

At 505, a first UE 115 (e.g., UE 115-*c*) may transmit, to a second UE 115 (e.g., UE 115-*d*) a first message in a first TTI via a sidelink communications link. The first message may be an example of a first data transmission.

At 510, UE 115-*c* may monitor the sidelink communications link during a second TTI subsequent to the first TTI for a feedback message 515 from UE 115-*d* in response to the first message transmitted by UE 115-*c*. The monitoring may be part of a RLM procedure for the sidelink communications link.

Additional messages 515 may be transmitted by UE 115-*d* to UE 115-*c* before or after UE 115-*c* increments the counter at 520. UE 115-*d* may also transmit additional message 515 before and after UE 115-*c* increment the counter at 520. UE 115-*c* may increment the counter based on the number of negative feedback messages.

At 520, UE 115-*c* may increment, as part of the RLM procedure, a counter based on receipt of a negative feedback message of an unsuccessful receipt of the feedback message in the second TTI. UE 115-*d* may determine a threshold value for the counter or a timer duration for the timer based on a preconfigured threshold value, a value determined during establishment of the sidelink communications link, a priority level associated with data of the first message transmitted via the sidelink communications link, an indication from a base station, or a combination thereof. The value for the counter or the timer duration for the timer may be determined during the establishment of the sidelink communication channel via RRC signaling.

In some cases, UE 115-*c* may receive a number of negative feedback messages from UE 115-*d* (e.g., one or more additional messages transmitted by UE 115-*d* at 515). UE 115-*c* may determine a RLF for the sidelink communications link based on the counter exceeding a threshold value.

In other cases, UE 115-*c* may also fail to decode a number of feedback messages from UE 115-*d*. UE 115-*c* may increment the counter based on the number of feedback messages that failed decoding. UE 115-*c* may determine a RLF for the sidelink communications link based on the counter exceeding a threshold value.

In some cases, UE 115-*c* may receive a HARQ feedback message (e.g., an ACK) prior to the expiration of the timer. UE 115-*c* may reset the timer based on the HARQ feedback message (e.g., the ACK).

After initiating the timer, UE 115-*c* may monitor for one or more feedback messages from UE 115-*d* within a timer duration associated with the timer. UE 115-*c* may determine a RLF for the sidelink communications link based on none of the one or more feedback messages from UE 115-*d* being successfully received after the timer duration has expired.

UE 115-*c* may determine a RLF for the sidelink communications link based on the counter exceeding a threshold value or upon expiration of the timer. The threshold value of the counter or the timer duration of the timer determined during establishment of the sidelink communications link may be based on a speed of UE 115-*c* or UE 115-*d*, a congestion level of the sidelink communications link, the priority level associated with data of the first message transmitted via the sidelink communications link, an application for which the sidelink communications link is used, or a combination thereof.

UE 115-*c* may determine an upper bound and a lower bound for the threshold value of the counter or the timer duration of the timer. The upper bound and the lower bound may be based on preconfigured values, a priority level associated with data of the first message transmitted via the sidelink communications link, an application for which the sidelink communication link is used, or a combination thereof. UE 115-*c* may reconfigure the threshold value of the counter or the timer duration of the timer based on a change in speed of UE 115-*c* or UE 115-*d*, a congestion level of the sidelink communications link, a change in a priority level associated with data transmitted via the sidelink communications link, or a combination thereof.

UE 115-*c* may determine the unsuccessful receipt of the feedback messages based on failing to successfully decode the feedback message in the second TTI, or in one or more subsequent feedback occasions.

Figure 6:
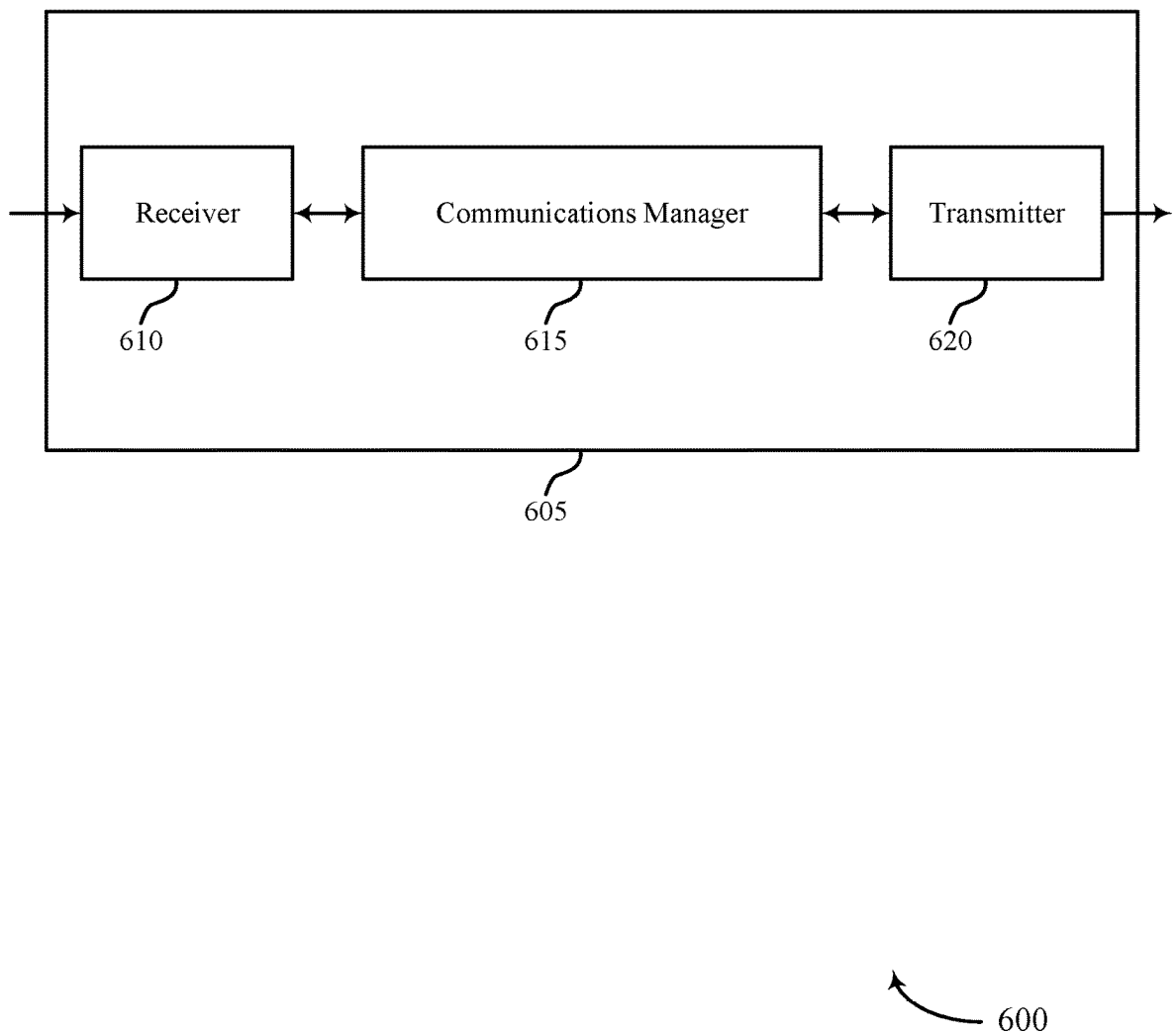
FIGS. 6 and 7 show block diagrams of devices in accordance with aspects of the present disclosure.

FIG. 6 shows a block diagram 600 of a device 605 that supports radio link monitoring for sidelink communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to radio link monitoring for sidelink communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit, to a second UE, a first message in a first transmission time interval via a sidelink communications link, monitor the sidelink communications link during a second transmission time interval subsequent to the first transmission time interval for a feedback message from the second UE in response to the first message transmitted by the first UE, where the monitoring is part of a radio link monitoring procedure for the sidelink communications link, and increment, as part of the radio link monitoring procedure, a counter based on or an unsuccessful receipt of the feedback message in the second transmission time interval. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 described herein may be implemented as a chipset of a wireless modem, and the receiver 610 and the transmitter 620 may be implemented as sets of analog components (e.g., amplifiers, filters, phase shifters, antennas, etc.). The wireless modem may obtain and decode signals from the receiver 610 over a receive interface, and may output signals for transmission to the transmitter 620 over a transmit interface.

The actions performed by UE communications manager 615 as described herein may be implemented to realize one or more advantages. One implementation may allow the device 605 to efficiently detect RLF in a sidelink communication link. This may decrease the number of transmissions and retransmissions that may have occurred if the device 605 had not detected the RLF. This may further allow the device 605 to save power and increase battery life by performing communications more efficiently, and recovering connectivity in a sidelink channel more quickly. This may also lead to a more efficient use of resources, as the number of retransmissions may decrease based on declaring the RLF and recovering the sidelink communications earlier.

Figure 7:
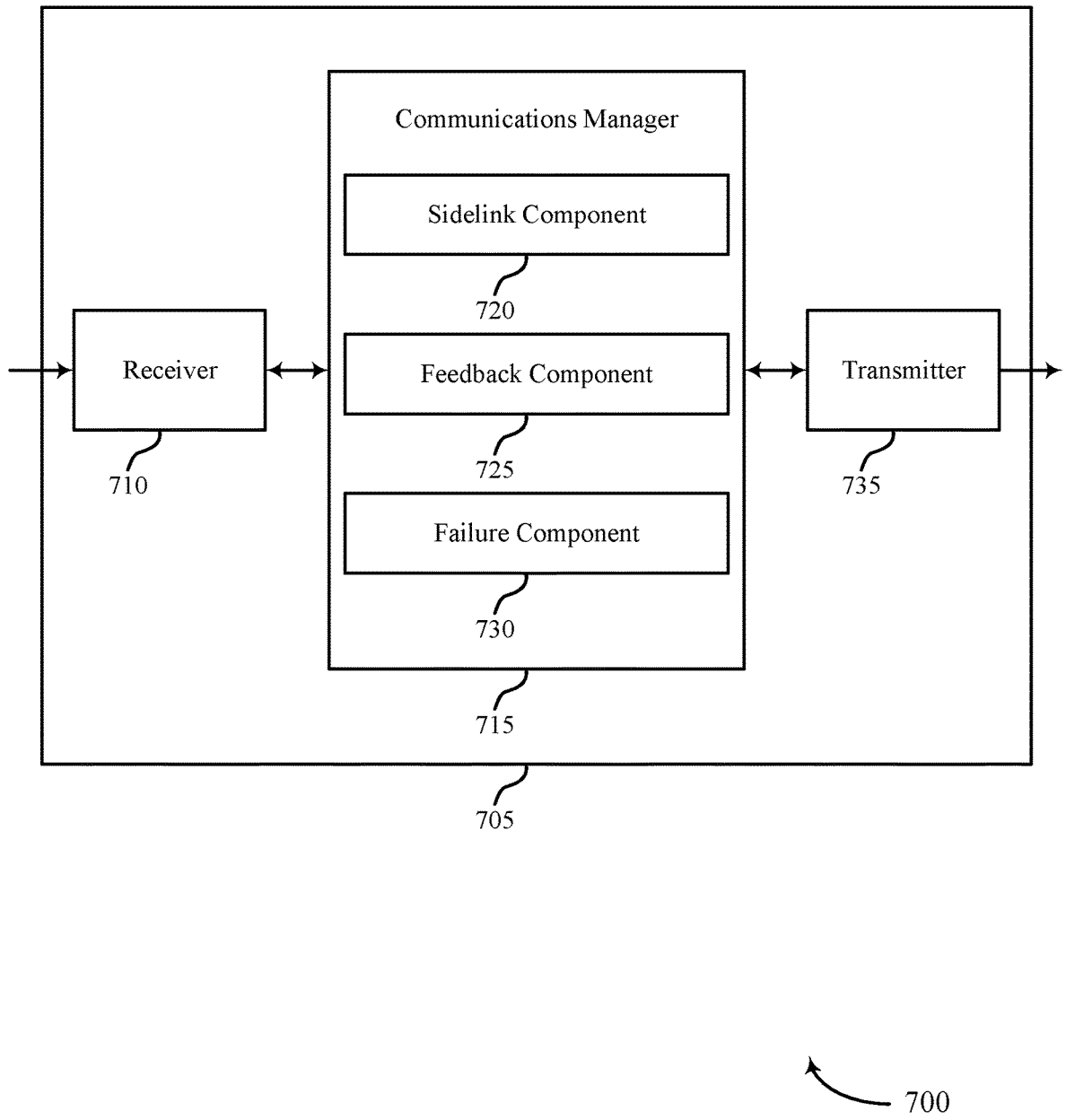

FIG. 7 shows a block diagram 700 of a device 705 that supports radio link monitoring for sidelink communications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to radio link monitoring for sidelink communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a sidelink component 720, a feedback component 725, and a failure component 730. The communications manager 715 may be an example of aspects of the communications manager 910 described herein.

The sidelink component 720 may transmit, to a second UE, a first message in a first transmission time interval via a sidelink communications link.

The feedback component 725 may monitor the sidelink communications link during a second transmission time interval subsequent to the first transmission time interval for a feedback message from the second UE in response to the first message transmitted by the first UE, where the monitoring is part of a radio link monitoring procedure for the sidelink communications link.

The failure component 730 may increment, as part of the radio link monitoring procedure, a counter based on an unsuccessful receipt of the feedback message in the second transmission time interval.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

A processor of a UE 115 may increment a counter to efficiently determine when a RLF occurs in a sidelink communications channel. Based on configuring a UE 115 to detect RLF based on the counter, the processor of a UE 115 may efficiently determine that RLF has occurred, and may take action to recover the sidelink communications link with one or more other UEs. The processor of the UE 115 may in some cases declare RLF, and the processor may then initiate commands to reestablish communications over the failed link or, in some cases, a new link.

Figure 8:
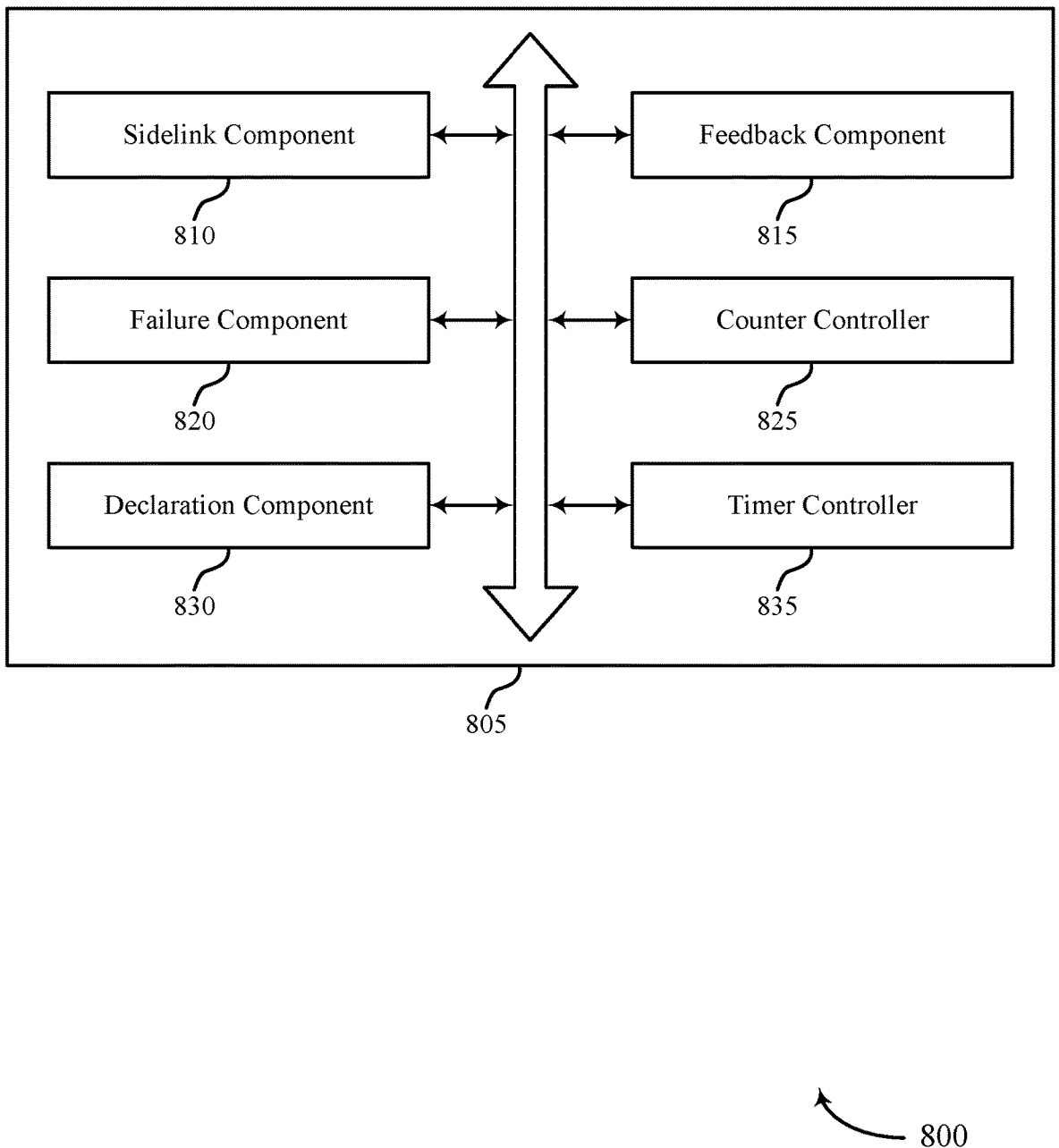
FIG. 8 shows a block diagram of a communications manager in accordance with aspects of the present disclosure.

FIG. 8 shows a block diagram 800 of a communications manager 805 that supports radio link monitoring for sidelink communications in accordance with aspects of the present disclosure. The communications manager 805 may be an example of aspects of a communications manager 615, a communications manager 715, or a communications manager 910 described herein. The communications manager 805 may include a sidelink component 810, a feedback component 815, a failure component 820, a counter controller 825, a declaration component 830, and a timer controller 835. Each of these modules may communicate, directly or indirectly, with one another (e.g., via one or more buses).

The sidelink component 810 may transmit, to a second UE, a first message in a first transmission time interval via a sidelink communications link.

The feedback component 815 may monitor the sidelink communications link during a second transmission time interval subsequent to the first transmission time interval for a feedback message from the second UE in response to the first message transmitted by the first UE, where the monitoring is part of a radio link monitoring procedure for the sidelink communications link.

In some examples, the feedback component 815 may receive a number of negative feedback messages from the second UE. In some examples, the feedback component 815 may fail to decode a number of feedback messages from the second UE. In some examples, the feedback component 815 may receive a HARQ feedback message prior to expiration of the timer. In some examples, the feedback component 815 may monitor, after incrementing the counter, for one or more feedback messages from the second UE prior to a threshold value of the counter. In some examples, the feedback component 815 may determine the unsuccessful receipt of the feedback message based on failing to successfully decode the feedback message in the second transmission time interval or in one or more subsequent feedback occasions.

The failure component 820 may increment, as part of the radio link monitoring procedure, a counter based on an unsuccessful receipt of the feedback message in the second transmission time interval.

The counter controller 825 may increment the counter based on the number of negative feedback messages. In some examples, the counter controller 825 may increment the counter based on the number of feedback messages that failed decoding.

In some examples, the counter controller 825 may determine a threshold value for the counter based on a preconfigured threshold value, a value determined during establishment of the sidelink communications link, a priority level associated with data of the first message transmitted via the sidelink communications link, an indication from a base station, or a combination thereof.

In some examples, the counter controller 825 may determine the threshold value of the counter based on a preconfigured threshold value, a value determined during establishment of the sidelink communications link, a priority level associated with data of the first message transmitted via the sidelink communications link, an indication from a base station, or a combination thereof.

In some examples, the counter controller 825 may determine an upper bound and a lower bound for the threshold value of the counter, where the upper bound and the lower bound are based on preconfigured values, a priority level associated with data of the first message transmitted via the sidelink communications link, an application for which the sidelink communications link is used, or a combination thereof.

In some examples, the counter controller 825 may reconfigure the threshold value of the counter based on a change in speed of the first UE or the second UE, a congestion level of the sidelink communications link, a change in a priority level associated with data transmitted via the sidelink communications link, or a combination thereof. In some cases, the value for the counter is determined during establishment of the sidelink communication channel via RRC signaling.

In some cases, the threshold value of the counter determined during establishment of the sidelink communications link is based on a speed of the first UE or the second UE, a congestion level of the sidelink communications link, the priority level associated with data of the first message transmitted via the sidelink communications link, an application for which the sidelink communications link is used, or a combination thereof.

The declaration component 830 may determine a radio link failure for the sidelink communications link based on the counter exceeding a threshold value. In some examples, the declaration component 830 may determine a radio link failure for the sidelink communications link based on none of the one or more feedback messages from the second UE being successfully received after the timer duration has expired.

In some examples, the declaration component 830 may determine a radio link failure for the sidelink communications link based on the counter exceeding a threshold value.

The timer controller 835 may reset the counter based on the HARQ feedback message (e.g., an ACK feedback message).

Figure 9:
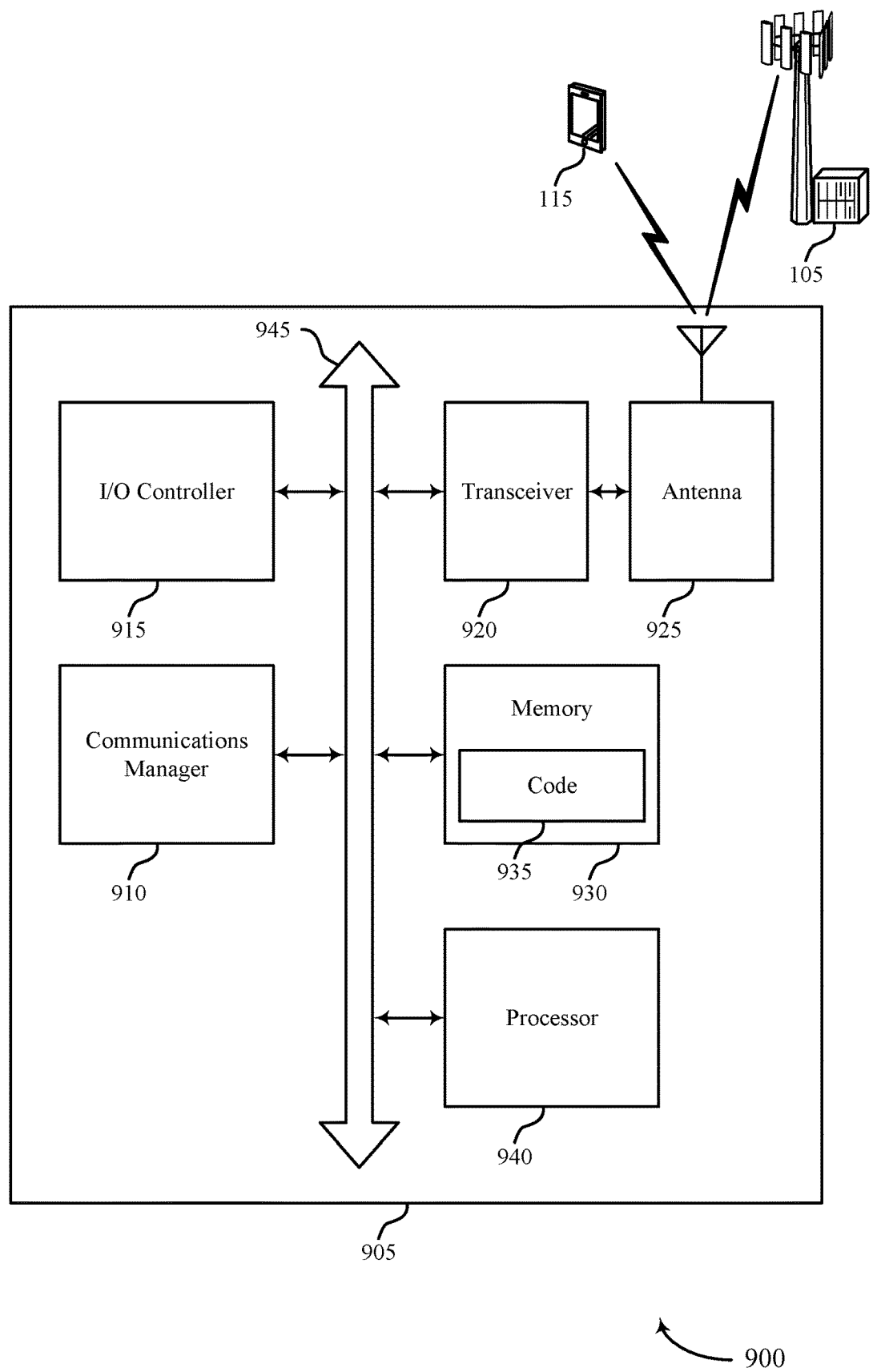
FIG. 9 shows a diagram of a system including a device in accordance with aspects of the present disclosure.

FIG. 9 shows a diagram of a system 900 including a device 905 that supports radio link monitoring for sidelink communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit, to a second UE, a first message in a first transmission time interval via a sidelink communications link, monitor the sidelink communications link during a second transmission time interval subsequent to the first transmission time interval for a feedback message from the second UE in response to the first message transmitted by the first UE, where the monitoring is part of a radio link monitoring procedure for the sidelink communications link, and increment, as part of the radio link monitoring procedure, a counter based on an unsuccessful receipt of the feedback message in the second transmission time interval.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting radio link monitoring for sidelink communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
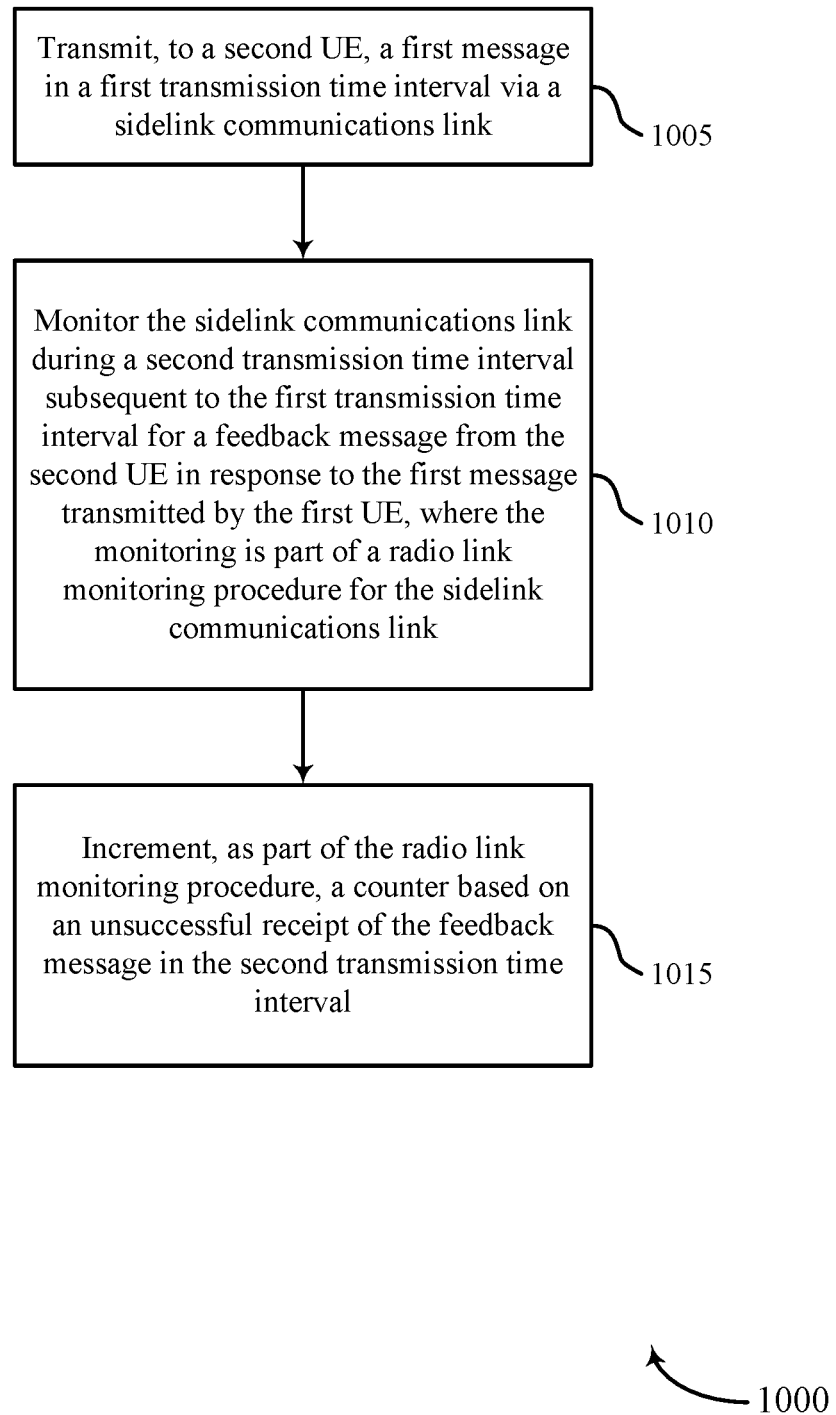
FIGS. 10 through 13 show flowcharts illustrating methods in accordance with aspects of the present disclosure.

FIG. 10 shows a flowchart illustrating a method 1000 that supports radio link monitoring for sidelink communications in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1005, the UE may transmit, to a second UE, a first message in a first transmission time interval via a sidelink communications link. The operations of 1005 may be performed according to the methods described herein. In some examples, aspects of the operations of 1005 may be performed by a sidelink component as described with reference to FIGS. 6 through 9.

At 1010, the UE may monitor the sidelink communications link during a second transmission time interval subsequent to the first transmission time interval for a feedback message from the second UE in response to the first message transmitted by the first UE, where the monitoring is part of a radio link monitoring procedure for the sidelink communications link. The operations of 1010 may be performed according to the methods described herein. In some examples, aspects of the operations of 1010 may be performed by a feedback component as described with reference to FIGS. 6 through 9.

At 1015, the UE may increment, as part of the radio link monitoring procedure, a counter based on an unsuccessful receipt of the feedback message in the second transmission time interval. The operations of 1015 may be performed according to the methods described herein. In some examples, aspects of the operations of 1015 may be performed by a failure component as described with reference to FIGS. 6 through 9.

Figure 11:
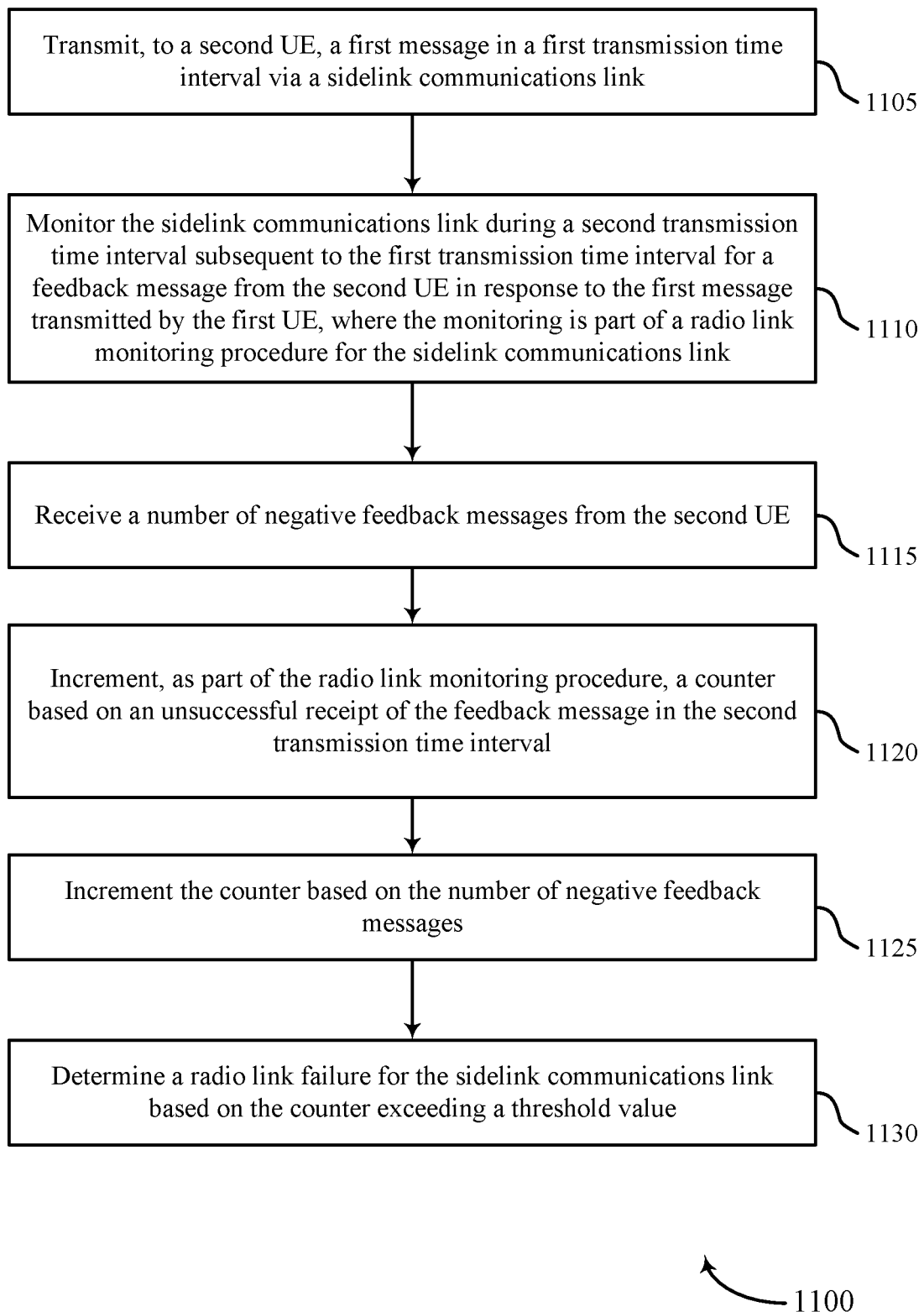

FIG. 11 shows a flowchart illustrating a method 1100 that supports radio link monitoring for sidelink communications in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1105, the UE may transmit, to a second UE, a first message in a first transmission time interval via a sidelink communications link. The operations of 1105 may be performed according to the methods described herein. In some examples, aspects of the operations of 1105 may be performed by a sidelink component as described with reference to FIGS. 6 through 9.

At 1110, the UE may monitor the sidelink communications link during a second transmission time interval subsequent to the first transmission time interval for a feedback message from the second UE in response to the first message transmitted by the first UE, where the monitoring is part of a radio link monitoring procedure for the sidelink communications link. The operations of 1110 may be performed according to the methods described herein. In some examples, aspects of the operations of 1110 may be performed by a feedback component as described with reference to FIGS. 6 through 9.

At 1115, the UE may receive a number of negative feedback messages from the second UE. The operations of 1115 may be performed according to the methods described herein. In some examples, aspects of the operations of 1115 may be performed by a feedback component as described with reference to FIGS. 6 through 9.

At 1120, the UE may increment, as part of the radio link monitoring procedure, a counter based on an unsuccessful receipt of the feedback message in the second transmission time interval. The operations of 1120 may be performed according to the methods described herein. In some examples, aspects of the operations of 1120 may be performed by a failure component as described with reference to FIGS. 6 through 9.

At 1125, the UE may increment the counter based on the number of negative feedback messages. The operations of 1125 may be performed according to the methods described herein. In some examples, aspects of the operations of 1125 may be performed by a counter controller as described with reference to FIGS. 6 through 9.

At 1130, the UE may determine a radio link failure for the sidelink communications link based on the counter exceeding a threshold value. The operations of 1130 may be performed according to the methods described herein. In some examples, aspects of the operations of 1130 may be performed by a declaration component as described with reference to FIGS. 6 through 9.

Figure 12:
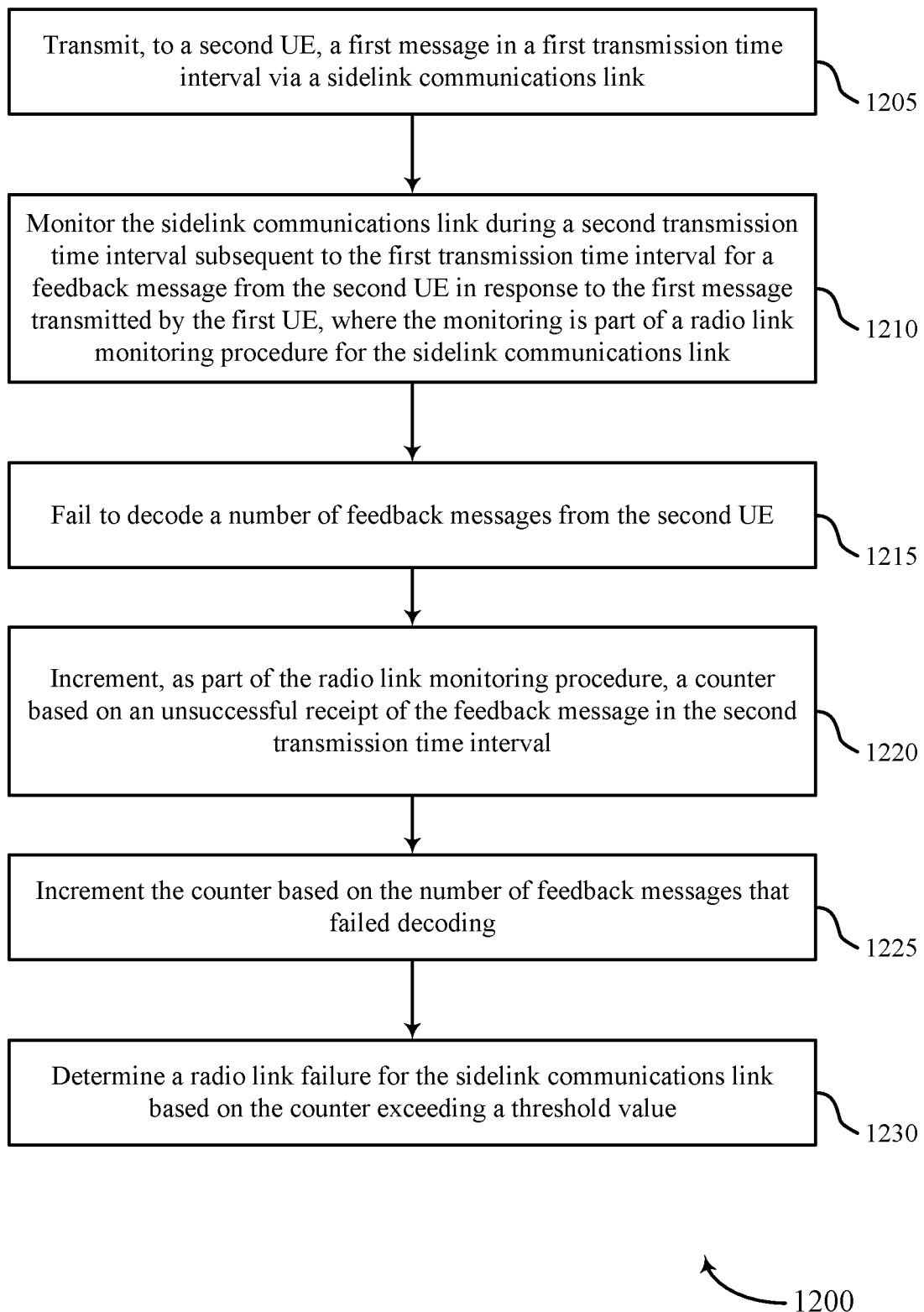

FIG. 12 shows a flowchart illustrating a method 1200 that supports radio link monitoring for sidelink communications in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1205, the UE may transmit, to a second UE, a first message in a first transmission time interval via a sidelink communications link. The operations of 1205 may be performed according to the methods described herein. In some examples, aspects of the operations of 1205 may be performed by a sidelink component as described with reference to FIGS. 6 through 9.

At 1210, the UE may monitor the sidelink communications link during a second transmission time interval subsequent to the first transmission time interval for a feedback message from the second UE in response to the first message transmitted by the first UE, where the monitoring is part of a radio link monitoring procedure for the sidelink communications link. The operations of 1210 may be performed according to the methods described herein. In some examples, aspects of the operations of 1210 may be performed by a feedback component as described with reference to FIGS. 6 through 9.

At 1215, the UE may fail to decode a number of feedback messages from the second UE. The operations of 1215 may be performed according to the methods described herein. In some examples, aspects of the operations of 1215 may be performed by a feedback component as described with reference to FIGS. 6 through 9.

At 1220, the UE may increment, as part of the radio link monitoring procedure, a counter based on an unsuccessful receipt of the feedback message in the second transmission time interval. The operations of 1220 may be performed according to the methods described herein. In some examples, aspects of the operations of 1220 may be performed by a failure component as described with reference to FIGS. 6 through 9.

At 1225, the UE may increment the counter based on the number of feedback messages that failed decoding. The operations of 1225 may be performed according to the methods described herein. In some examples, aspects of the operations of 1225 may be performed by a counter controller as described with reference to FIGS. 6 through 9.

At 1230, the UE may determine a radio link failure for the sidelink communications link based on the counter exceeding a threshold value. The operations of 1230 may be performed according to the methods described herein. In some examples, aspects of the operations of 1230 may be performed by a declaration component as described with reference to FIGS. 6 through 9.

Figure 13:
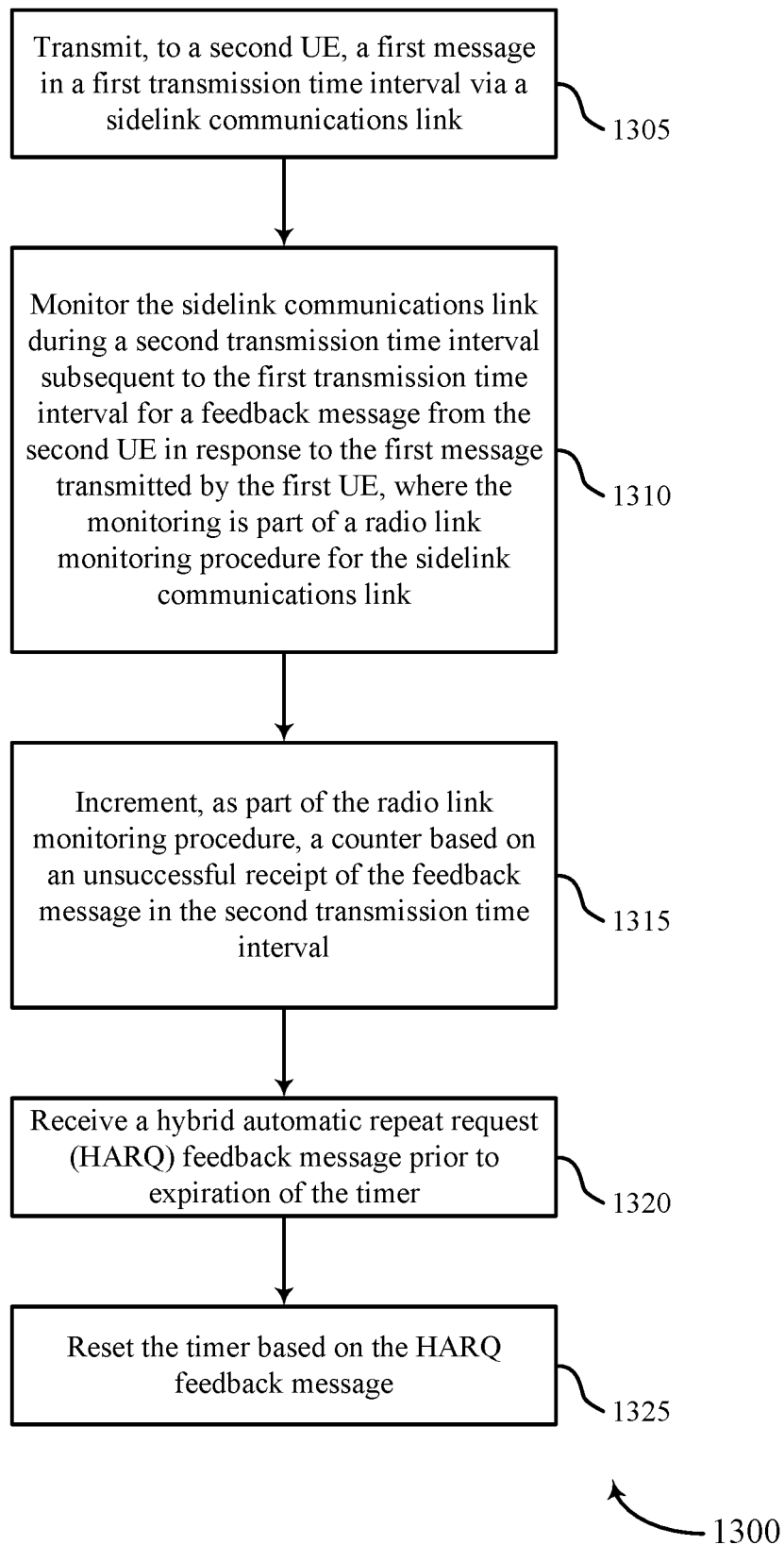

FIG. 13 shows a flowchart illustrating a method 1300 that supports radio link monitoring for sidelink communications in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1305, the UE may transmit, to a second UE, a first message in a first transmission time interval via a sidelink communications link. The operations of 1305 may be performed according to the methods described herein. In some examples, aspects of the operations of 1305 may be performed by a sidelink component as described with reference to FIGS. 6 through 9.

At 1310, the UE may monitor the sidelink communications link during a second transmission time interval subsequent to the first transmission time interval for a feedback message from the second UE in response to the first message transmitted by the first UE, where the monitoring is part of a radio link monitoring procedure for the sidelink communications link. The operations of 1310 may be performed according to the methods described herein. In some examples, aspects of the operations of 1310 may be performed by a feedback component as described with reference to FIGS. 6 through 9.

At 1315, the UE may initiate, as part of the radio link monitoring procedure, a counter based on an unsuccessful receipt of the feedback message in the second transmission time interval. The operations of 1315 may be performed according to the methods described herein. In some examples, aspects of the operations of 1315 may be performed by a failure component as described with reference to FIGS. 6 through 9.

At 1320, the UE may receive a HARQ feedback message prior to expiration of the timer. The operations of 1320 may be performed according to the methods described herein. In some examples, aspects of the operations of 1320 may be performed by a feedback component as described with reference to FIGS. 6 through 9.

At 1325, the UE may reset the counter based on the HARQ feedback message. The operations of 1325 may be performed according to the methods described herein. In some examples, aspects of the operations of 1325 may be performed by a timer controller as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Further, "a number of" may mean "one or more".

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
    receiving signaling indicating a threshold quantity of unsuccessfully received feedback messages that is associated with a radio link monitoring procedure for a sidelink communications link;
    transmitting, to a second UE, a first message in a first transmission time interval via the sidelink communications link;
    monitoring the sidelink communications link during a second transmission time interval subsequent to the first transmission time interval for a feedback message from the second UE in response to the first message transmitted by the first UE, wherein the monitoring is part of the radio link monitoring procedure for the sidelink communications link;
    incrementing, as part of the radio link monitoring procedure, a counter based at least in part on an unsuccessful receipt of the feedback message in the second transmission time interval;
    monitoring, based at least in part on incrementing the counter, whether the sidelink communications link corresponds to a radio link failure based at least in part on whether the counter exceeds the threshold quantity;
    receiving a hybrid automatic repeat request (HARQ) feedback message comprising a negative acknowledgement prior to the counter exceeding the threshold quantity of unsuccessfully received feedback messages; and
    resetting the counter based at least in part on the HARQ feedback message comprising the negative acknowledgement.

2. The method of claim 1, further comprising:
    failing to decode a number of feedback messages from the second UE;
    incrementing the counter based at least in part on the number of feedback messages that failed decoding; and
    determining the radio link failure for the sidelink communications link based at least in part on the counter exceeding the threshold quantity.

3. The method of claim 2, further comprising:
    resetting the counter based at least in part on a successful decoding of the HARQ feedback message from the second UE.

4. The method of claim 1, further comprising:
    monitoring, after incrementing the counter, for one or more feedback messages from the second UE prior to the counter exceeding the threshold quantity; and
    determining the radio link failure for the sidelink communications link based at least in part on none of the one or more feedback messages from the second UE being successfully received after the counter exceeds the threshold quantity.

5. The method of claim 4, wherein the threshold quantity is determined during establishment of the sidelink communications link is based at least in part on a speed of the first UE or the second UE, a congestion level of the sidelink communications link, a priority level associated with data of the first message transmitted via the sidelink communications link, an application for which the sidelink communications link is used, or a combination thereof.

6. The method of claim 4, further comprising:
determining an upper bound and a lower bound for the threshold quantity, wherein the upper bound and the lower bound are based at least in part on preconfigured values, a priority level associated with data of the first message transmitted via the sidelink communications link, an application for which the sidelink communications link is used, or a combination thereof.

7. The method of claim 4, further comprising:
reconfiguring the threshold quantity based at least in part on a change in speed of the first UE or the second UE, a congestion level of the sidelink communications link, a change in a priority level associated with data transmitted via the sidelink communications link, or a combination thereof.

8. The method of claim 1, further comprising:
determining the threshold quantity based at least in part on a preconfigured threshold value, a value determined during establishment of the sidelink communications link, a priority level associated with data of the first message transmitted via the sidelink communications link, receiving the signaling indicating the threshold quantity from a network entity, or a combination thereof.

9. The method of claim 1, wherein the signaling indicating the threshold quantity of unsuccessfully received feedback messages is received during establishment of the sidelink communications link via radio resource control (RRC) signaling.

10. The method of claim 1, further comprising:
determining the radio link failure for the sidelink communications link based at least in part on the counter exceeding the threshold quantity.

11. The method of claim 1, further comprising:
determining the unsuccessful receipt of the feedback message based at least in part on failing to successfully decode the feedback message in the second transmission time interval or in one or more subsequent feedback occasions.

12. An apparatus for wireless communications at a first user equipment (UE), comprising:
a processor,
memory coupled to the processor, the memory comprising instructions executable by the processor to cause the apparatus to:
receive signaling indicating a threshold quantity of unsuccessfully received feedback messages that is associated with a radio link monitoring procedure for a sidelink communications link;
transmit, to a second UE, a first message in a first transmission time interval via the sidelink communications link;
monitor the sidelink communications link during a second transmission time interval subsequent to the first transmission time interval for a feedback message from the second UE in response to the first message transmitted by the first UE, wherein the monitoring is part of the radio link monitoring procedure for the sidelink communications link;
increment, as part of the radio link monitoring procedure, a counter based at least in part on or an unsuccessful receipt of the feedback message in the second transmission time interval;
monitor, based at least in part on incrementing the counter, whether the sidelink communications link corresponds to a radio link failure based at least in part on whether the counter exceeds the threshold quantity;
receive a hybrid automatic repeat request (HARQ) feedback message comprising a negative acknowledgement prior to the counter exceeding the threshold quantity of unsuccessfully received feedback messages; and
reset the counter based at least in part on the HARQ feedback message comprising the negative acknowledgement.

13. The apparatus of claim 12, wherein the instructions are further executable by the processor to cause the apparatus to:
fail to decode a number of feedback messages from the second UE;
increment the counter based at least in part on the number of feedback messages that failed decoding; and
determine the radio link failure for the sidelink communications link based at least in part on the counter exceeding the threshold quantity.

14. The apparatus of claim 13, wherein the instructions are further executable by the processor to cause the apparatus to:
reset the counter based at least in part on a successful decoding of a hybrid automatic repeat request (HARQ) feedback message from the second UE.

15. The apparatus of claim 12, wherein the instructions are further executable by the processor to cause the apparatus to:
monitor, after incrementing the counter, for one or more feedback messages from the second UE prior to the counter exceeding the threshold quantity; and
determine the radio link failure for the sidelink communications link based at least in part on none of the one or more feedback messages from the second UE being successfully received after the counter exceeds the threshold quantity.

16. The apparatus of claim 15, wherein the threshold quantity is determined during establishment of the sidelink communications link is based at least in part on a speed of the first UE or the second UE, a congestion level of the sidelink communications link, a priority level associated with data of the first message transmitted via the sidelink communications link, an application for which the sidelink communications link is used, or a combination thereof.

17. The apparatus of claim 15, wherein the instructions are further executable by the processor to cause the apparatus to:
determine an upper bound and a lower bound for the threshold quantity, wherein the upper bound and the lower bound are based at least in part on preconfigured values, a priority level associated with data of the first message transmitted via the sidelink communications link, an application for which the sidelink communications link is used, or a combination thereof.

18. The apparatus of claim 15, wherein the instructions are further executable by the processor to cause the apparatus to:
reconfigure the threshold quantity based at least in part on a change in speed of the first UE or the second UE, a congestion level of the sidelink communications link, a change in a priority level associated with data transmitted via the sidelink communications link, or a combination thereof.

19. The apparatus of claim 12, wherein the instructions are further executable by the processor to cause the apparatus to:
determine the threshold quantity based at least in part on a preconfigured threshold value, a value determined during establishment of the sidelink communications link, a priority level associated with data of the first message transmitted via the sidelink communications link, receiving the signaling indicating the threshold quantity from a network entity, or a combination thereof.

20. The apparatus of claim 12, wherein the signaling indicating the threshold quantity is received during establishment of the sidelink communications link via radio resource control (RRC) signaling.

21. The apparatus of claim 12, wherein the instructions are further executable by the processor to cause the apparatus to:
determine the radio link failure for the sidelink communications link based at least in part on the counter exceeding the threshold quantity.

22. The apparatus of claim 12, wherein the instructions are further executable by the processor to cause the apparatus to:
determine the unsuccessful receipt of the feedback message based at least in part on failing to successfully decode the feedback message in the second transmission time interval or in one or more subsequent feedback occasions.

23. An apparatus for wireless communications at a first user equipment (UE), comprising:
means for receiving signaling indicating a threshold quantity of unsuccessfully received feedback messages that is associated with a radio link monitoring procedure for a sidelink communications link;
means for transmitting, to a second UE, a first message in a first transmission time interval via the sidelink communications link;
means for monitoring the sidelink communications link during a second transmission time interval subsequent to the first transmission time interval for a feedback message from the second UE in response to the first message transmitted by the first UE, wherein the monitoring is part of the radio link monitoring procedure for the sidelink communications link;
means for incrementing, as part of the radio link monitoring procedure, a counter based at least in part on an unsuccessful receipt of the feedback message in the second transmission time interval;
means for monitoring, based at least in part on incrementing the counter, whether the sidelink communications link corresponds to a radio link failure based at least in part on whether the counter exceeds the threshold quantity;
means for receiving a hybrid automatic repeat request (HARQ) feedback message comprising a negative acknowledgement prior to the counter exceeding the threshold quantity of unsuccessfully received feedback messages; and
means for resetting the counter based at least in part on the HARQ feedback message comprising the negative acknowledgement.

24. A non-transitory computer-readable medium storing code for wireless communications at a first user equipment (UE), the code comprising instructions executable by a processor to:
receive signaling indicating a threshold quantity of unsuccessfully received feedback messages that is associated with a radio link monitoring procedure for a sidelink communications link;
transmit, to a second UE, a first message in a first transmission time interval via the sidelink communications link;
monitor the sidelink communications link during a second transmission time interval subsequent to the first transmission time interval for a feedback message from the second UE in response to the first message transmitted by the first UE, wherein the monitoring is part of the radio link monitoring procedure for the sidelink communications link;
increment, as part of the radio link monitoring procedure, a counter based at least in part on or an unsuccessful receipt of the feedback message in the second transmission time interval;
monitor, based at least in part on incrementing the counter, whether the sidelink communications link corresponds to a radio link failure based at least in part on whether the counter exceeds the threshold quantity;
receive a hybrid automatic repeat request (HARQ) feedback message comprising a negative acknowledgement prior to the counter exceeding the threshold quantity of unsuccessfully received feedback messages; and
reset the counter based at least in part on the HARQ feedback message comprising the negative acknowledgement.

* * * * *